US008332344B2

(12) United States Patent
Kato

(10) Patent No.: US 8,332,344 B2
(45) Date of Patent: Dec. 11, 2012

(54) OPERATION MANAGEMENT APPARATUS, OPERATION MANAGEMENT METHOD, AND OPERATION MANAGEMENT PROGRAM

(75) Inventor: Kiyoshi Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 560 days.

(21) Appl. No.: 12/530,762

(22) PCT Filed: Mar. 4, 2008

(86) PCT No.: PCT/JP2008/053830
§ 371 (c)(1),
(2), (4) Date: Sep. 10, 2009

(87) PCT Pub. No.: WO2008/111428
PCT Pub. Date: Sep. 18, 2008

(65) Prior Publication Data
US 2010/0057660 A1    Mar. 4, 2010

(30) Foreign Application Priority Data

Mar. 14, 2007   (JP) .................................. 2007-064678

(51) Int. Cl.
*G06F 17/00*   (2006.01)
(52) U.S. Cl. ......................................................... 706/47
(58) Field of Classification Search .................. None
See application file for complete search history.

(56) References Cited

U.S. PATENT DOCUMENTS 7,490,073 B1 *   2/2009   Qureshi et al. .................. 706/50

FOREIGN PATENT DOCUMENTS

| JP | 2002-318710 A | 10/2002 |
| JP | 2005-141466 A | 6/2005 |
| JP | 2005-182647 A | 7/2005 |
| JP | 2005-316692 A | 11/2005 |
| JP | 2005-327261 A | 11/2005 |
| JP | 2006-004346 A | 1/2006 |
| JP | 2006-244404 A | 9/2006 |
| JP | 2006-318071 A | 11/2006 |
| JP | 2006-338305 A | 12/2006 |

OTHER PUBLICATIONS

International Search Report for PCT/JP2008/053830 mailed Apr. 8, 2008.

* cited by examiner

*Primary Examiner* — Alan Chen

(57) ABSTRACT

An operation management apparatus decides that newly-generated event data and previously-existing predictive event data match if the attribute values of the event data match the attribute values of the predictive event data excluding reference values. In such a case, the apparatus identifies individual filter information whose attribute values excluding reference values match the attribute values of the event data, and substitutes the attribute values of the event data for variables in each piece of individual filter information belonging to a group to which the individual filter information belongs, thereby generating predictive event data for each piece of individual filter information. The apparatus decides whether or not each piece of event data that is associated in a predictive event index with the group to which the individual filter information that matches the event data used for generating the predictive event data belongs satisfies the individual filter information of operation rule information corresponding to the group, and if satisfies, performs processing defined by the operation rule information.

16 Claims, 29 Drawing Sheets

FIG. 3

```
[RULE FILTER]
NUMBER = F1012
TYPE =
DATE1 =
TIME1 = [PERIOD($F01,*)]
SERVER =[$F02]
SOURCE = BIZAP
EVENTID = 8000
USER =
DESCRIPTION =
```
212: INDIVIDUAL FILTER INFORMATION

```
[RULE FILTER]
NUMBER = F1011
TYPE =
DATE1 =
TIME1 = [$F01]
SERVER =[$F02]
SOURCE = updater
EVENTID = 4001
USER =
DESCRIPTION =
```
211: INDIVIDUAL FILTER INFORMATION

FIG. 4

[RULE FILTER]
NUMBER = F1111
TYPE =
DATE1 =
TIME1 = [03:00:10]
SERVER =[SV4]
SOURCE = updater
EVENTID = 4001
USER =
DESCRIPTION =

221: PREDICTIVE EVENT DATA

[RULE FILTER]
NUMBER = F1112
TYPE =
DATE1 =
TIME1 = [PERIOD(03:00:10, *)]
SERVER =[SV4]
SOURCE = BIZAP
EVENTID = 8000
USER =
DESCRIPTION =

222: PREDICTIVE EVENT DATA

FIG. 6

| NUMBER | TYPE | DATE AND TIME | SOURCE | ID | USER | DESCRIPTION |
|---|---|---|---|---|---|---|
| : | : | : | : | : | : | : |
| E8010 | N/A | 2006/06/29-06:00:12 | SV2.updater | 4001 | root | MANUAL: PATCH APPLIED. |
| : | : | : | : | : | : | : |
| E8020 | N/A | 2006/06/29-07:08:33 | SV2.BIZAP | 8000 | root | MANUAL: NO RESPONSE FROM MASTER. |
| : | : | : | : | : | : | : |
| E8030 | WARNING | 2006/09/30-03:00:25 | SV3.updater | 4001 | N/A | PATCH APPLIED. |
| : | : | : | : | : | : | : |
| E8040 | INFORMATION | 2006/10/02-08:02:30 | SV3.BIZAP | 8000 | admin | TRANSACTION STARTED. |
| : | : | : | : | : | : | : |

101: EVENT LIST

FIG. 7

110: EVENT LIST

| NUMBER | TYPE | DATE AND TIME | SOURCE | ID | USER | DESCRIPTION |
|---|---|---|---|---|---|---|
| ... | ... | ... | ... | ... | ... | ... |
| E9001 | INFORMATION | 2006/10/30-23:05:30 | SV3.agent | 0033 | admin | TRANSACTION STOPPED. |
| E9002 | WARNING | 2006/10/31-03:00:10 | SV4.updater | 4001 | N/A | PATCH APPLIED. |
| E9003 | INFORMATION | 2006/10/31-08:00:10 | SV3.agent | 0032 | admin | TRANSACTION STARTED |
| E9004 | FAILURE | 2006/10/31-08:02:30 | SV3.BIZAP | 8000 | SYSTEM | NO RESPONSE FROM MASTER. |
| ... | ... | ... | ... | ... | ... | ... |

120: EVENT LIST

| NUMBER | TYPE | DATE AND TIME | SOURCE | ID | USER | DESCRIPTION |
|---|---|---|---|---|---|---|
| ... | ... | ... | ... | ... | ... | ... |
| E9001 | INFORMATION | 2006/10/30-23:05:30 | SV3.agent | 0033 | admin | TRANSACTION STOPPED. |
| E9002 | WARNING | 2006/10/31-03:00:10 | SV4.updater | 4001 | N/A | PATCH APPLIED. |
| E9003 | INFORMATION | 2006/10/31-08:00:10 | SV3.agent | 0032 | admin | TRANSACTION STARTED |
| E9004 | FAILURE | 2006/10/31-08:02:30 | SV3.BIZAP | 8000 | SYSTEM | NO RESPONSE FROM MASTER. |
| E9005 | FAILURE | 2006/10/31-08:10:00 | SV3.BIZAP | 8000 | SYSTEM | NO RESPONSE FROM MASTER. |
| E9006 | INFORMATION | 2006/10/31-08:10:33 | SV4.agent | 0132 | admin | MOVE BUSINESS AP. |
| E9007 | WARNING | 2006/10/31-08:11:30 | SV3.agent | 4001 | N/A | PATCH APPLIED. |
| E9008 | INFORMATION | 2006/10/31-08:12:00 | SV3.agent | 0132 | admin | MOVE BUSINESS AP. |
| ... | ... | ... | ... | ... | ... | ... |

FIG. 15

```
[RULE FILTER]
NUMBER = F1011
TYPE =
DATE1 =
TIME1 = [$F01]
SERVER =
SOURCE = updater
EVENT ID = 4001
USER =
DESCRIPTION =
```

211: INDIVIDUAL FILTER INFORMATION

```
[RULE FILTER]
NUMBER = F1012
TYPE =
DATE1 =
TIME1 = [PERIOD($F01, *)]
SERVER =
SOURCE = BIZAP
EVENTID = 8000
USER =
DESCRIPTION =
```

212: INDIVIDUAL FILTER INFORMATION

FIG. 16

```
[RULE FILTER]
NUMBER = F0011
TYPE =
DATE1 =
TIME1 =
SERVER = $SV
SOURCE = updater
EVENT ID = 4001
USER =
DESCRIPTION =
```
203: FILTER INFORMATION

```
[RULE FILTER]
NUMBER = F0012
TYPE =
DATE1 =
TIME1 =
SERVER = $SV
SOURCE = BIZAP
EVENT ID = 8000
USER =
DESCRIPTION =
```
204: FILTER INFORMATION

FIG. 17

```
[RULE FILTER]
NUMBER = F1011
TYPE =
DATE1 =
TIME1 = [$F01]
SERVER = $SV
SOURCE = updater
EVENT ID = 4001
USER =
DESCRIPTION =
```

213: INDIVIDUAL FILTER INFORMATION

```
[RULE FILTER]
NUMBER = F1012
TYPE =
DATE1 =
TIME1 = [PERIOD($F01,*)]
SERVER = $SV
SOURCE = BIZAP
EVENT ID = 8000
USER =
DESCRIPTION =
```

214: INDIVIDUAL FILTER INFORMATION

FIG. 18

[RULE FILTER]
NUMBER = F1112
TYPE =
DATE1 =
TIME1 = [PERIOD(03:00:10, *)]
SERVER = SV4
SOURCE = BIZAP
EVENT ID = 8000
USER =
DESCRIPTION =

224: PREDICTIVE EVENT DATA

[RULE FILTER]
NUMBER = F1111
TYPE =
DATE1 =
TIME1 = [03:00:10]
SERVER = SV4
SOURCE = updater
EVENT ID = 4001
USER =
DESCRIPTION =

223: PREDICTIVE EVENT DATA

FIG. 20

| NUMBER | TYPE | DATE AND TIME | SOURCE | ID | USER | DESCRIPTION |
|---|---|---|---|---|---|---|
| ... | ... | ... | ... | ... | ... | ... |
| E9001 | INFORMATION | 2006/10/30-23:05:30 | SV3.agent | 0033 | admin | TRANSACTION STOPPED. |
| E2001 | INFORMATION | 2006/10/30-03:00-01 | SV3.job | 0001 | N/A | JOB1 Success |
| E9002 | WARNING | 2006/10/31-03:00:10 | SV4.updater | 4001 | N/A | PATCH APPLIED. |
| E2002 | INFORMATION | 2006/10/31-03:15:01 | SV3.job | 0001 | N/A | JOB2 Success |
| E2003 | FAILURE | 2006/10/31-04:00:00 | SV3.job | 1000 | N/A | JOB3 Exit(Time Expired) |
| E9003 | INFORMATION | 2006/10/31-08:00:10 | SV3.agent | 0032 | admin | TRANSACTION STARTED |
| ... | ... | ... | ... | ... | ... | ... |

130: EVENT LIST

FIG. 22

| DECISION | NUMBER | GROUP NUMBER | CORRESPONDING EVENT |
|---|---|---|---|
| ... | ... | ... | ... |
| DONE | F1110 | G0110 | E9001 |
| | F2101 | G0200 | E2001 |
| | F2102 | G0200 | |

331: PREDICTIVE EVENT INDEX

| DECISION | NUMBER | GROUP NUMBER | CORRESPONDING EVENT |
|---|---|---|---|
| ... | ... | ... | ... |
| DONE | F1110 | G0110 | E9001 |
| DONE | F2101 | G0200 | E2001 |
| | F2102 | G0200 | E2002 |
| | F2103 | G0200 | E9002 |
| | F1111 | G0120 | |
| | F1112 | G0120 | |

332: PREDICTIVE EVENT INDEX

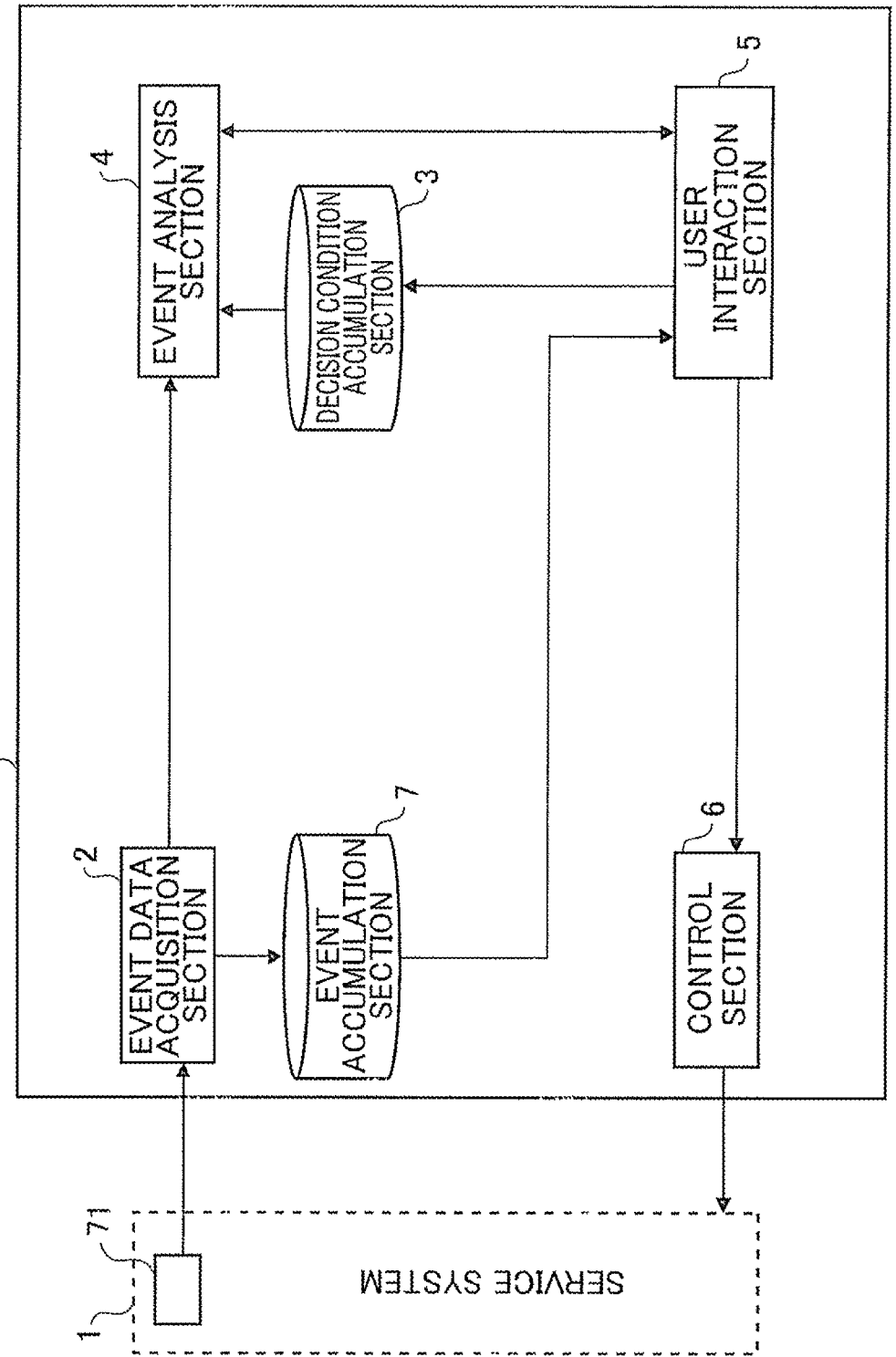

FIG. 26A

| NUMBER | TYPE | DATE AND TIME | SOURCE | ID | USER | DESCRIPTION |
|---|---|---|---|---|---|---|
| ... | ... | ... | ... | ... | ... | ... |
| E9001 | INFORMATION | 2006/10/30-23:05:30 | SV3.agent | 0033 | admin | TRANSACTION STOPPED. |
| E9002 | WARNING | 2006/10/31-03:00:10 | SV3.updater | 4001 | N/A | PATCH APPLIED. |
| E9003 | INFORMATION | 2006/10/31-08:00:10 | SV3.agent | 0032 | admin | TRANSACTION STARTED |
| E9004 | FAILURE | 2006/10/31-08:02:30 | SV3.BIZAP | 8000 | SYSTEM | NO RESPONSE FROM MASTER. |
| E9005 | INFORMATION | 2006/10/31-08:05:40 | SV3.agent | 0132 | admin | MOVE BUSINESS AP. |
| ... | ... | ... | ... | ... | ... | ... |

100: EVENT LIST

FIG. 26B

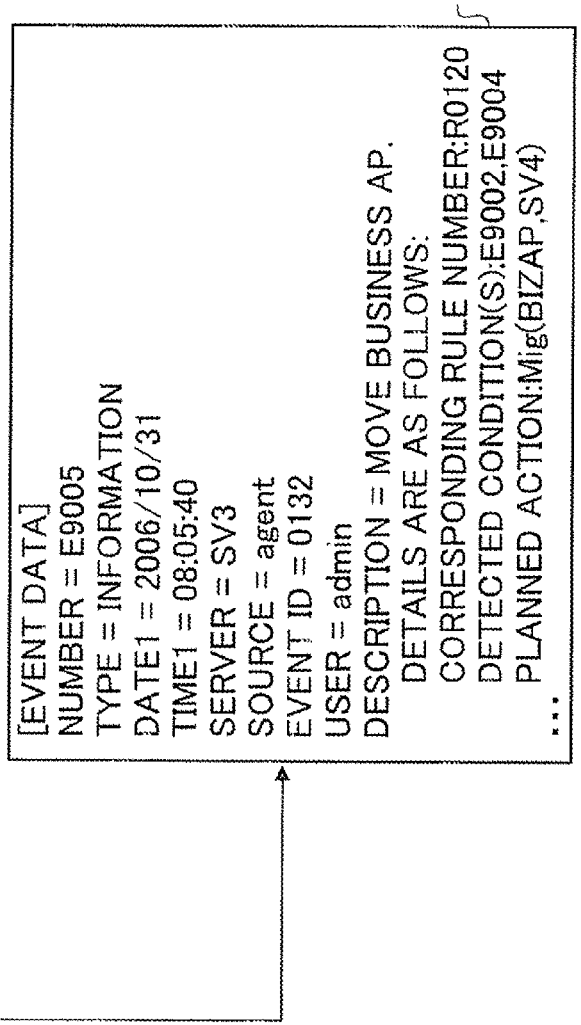

```
[EVENT DATA]
NUMBER = E9005
TYPE = INFORMATION
DATE1 = 2006/10/31
TIME1 = 08:05:40
SERVER = SV3
SOURCE = agent
EVENT ID = 0132
USER = admin
DESCRIPTION = MOVE BUSINESS AP.
  DETAILS ARE AS FOLLOWS:
  CORRESPONDING RULE NUMBER:R0120
  DETECTED CONDITION(S):E9002,E9004
  PLANNED ACTION:Mig(BIZAP,SV4)
...
```

101: EVENT DATA

FIG. 27A

| NUMBER | CONDITION | ACTION | DESCRIPTION |
|---|---|---|---|
| ... | ... | ... | ... |
| G0110 | F0010 | | AG MONITOR |
| G0120 | F0011 AND F0012 | Mig($F0012.SOURCE,$SV(NOUPDATE)) | TRANSACTION FAILURE (AFTER PATCHED) |
| G0130 | F0013 | MailTo(operator) | JOB FAILURE NOTIFICATION |
| ... | ... | ... | ... |

200: GROUP OF OPERATION RULES

FIG. 27B

```
[EVENT FILTER]
NUMBER = F0011
TYPE =
DATE1 =
TIME1 =
SERVER =
SOURCE = updater
EVENT ID = 4001
USER =
DESCRIPTION =
```
201: FILTER INFORMATION

```
[EVENT FILTER]
NUMBER = F0012
TYPE =
DATE1 =
TIME1 =
SERVER =
SOURCE = BIZAP
EVENT ID = 8000
USER =
DESCRIPTION =
```
202: FILTER INFORMATION

OPERATION MANAGEMENT APPARATUS, OPERATION MANAGEMENT METHOD, AND OPERATION MANAGEMENT PROGRAM

TECHNICAL FIELD

The present invention relates to an operation management apparatus, an operation management method, and an operation management program for analyzing the system state of a service system that provides information and communication services such as a WEB service and business service. In particular, the present invention relates to an operation management apparatus, an operation management method, and an operation management program that can improve the reliability of the service system and reduce operating burdens on a person who operates the operation management apparatus.

BACKGROUND ART

With the growing importance of WEB services and other information and communication services as social infrastructure, stable operation has become important of apparatuses that provide the services (hereinafter, referred to as service systems). The operation management of such service systems has been manually conducted by administrators heretofore. As the service systems increase in scale and complexity, however, the knowledge and operational burdens required of the administrators have increased dramatically, causing such problems as service suspension due to a decision error or operation error.

In an integrated operation management system for monitoring the states of hardware and software and controlling the same in a centralized fashion, event data (state notifications) acquired from a plurality of devices is automatically analyzed for combinations of abnormal states and the like so that macroscopic problems and causes can be estimated and notified to the administrator to support taking actions.

An example of the operation management apparatus according to the related art is described in Patent Document 1.

The operation management apparatus of the related art retains operation rule information that defines actions and the like corresponding to specified conditions with combinations of event data occurring in succession as the conditions. The event data is data that shows the state of a service system. If occurring event data satisfies a condition specified by operation rule information, the operation management apparatus performs actions and the like according to the operation rule information.

In this way, the operation management apparatus monitors and takes actions against abnormal states of the service system that are assumed in advance. The use of such an operation management apparatus reduces the operation burdens of the administrator significantly as compared to the case of manually monitoring and handling a large number of devices. Automatically taking actions and the like in accordance with the operation rule information allows constant monitoring and handling irrespective of the experience and skills of the administrator, and thus improves the quality of the operation management.

FIG. 25 is a block diagram showing the configuration of an operation management apparatus of the related art that is commonly known. The operation management apparatus 41 illustrated in FIG. 25 includes an event data acquisition section 2, an event accumulation section 7, an event analysis section 4, a decision condition accumulation section 3, a user interaction section 5, and a control section 6. The operation management apparatus 41 is connected to a service system 1. The operation management apparatus 41 and the service system 1 may be connected through a communication line or a communication network. The operation management apparatus 41 and the service system 1 may be configured as a single unit.

The service system 1 is an information processing apparatus or the like that provides information and communication services such as a WEB service and business service. For example, the service system 1 transmits a Web page to a terminal (not shown) in response to a request from the terminal, and executes business processing in response to a request from the terminal. The business services for the service system 1 to provide are not particularly limited.

The service system 1 includes an event data generating section 71 which generates event data. The event data is information that indicates the state of the service system 1. For example, the event data indicates the state of hardware equipped on the service system 1 or that of software implemented on the service system 1, the result of processing performed by the service system 1, and so on.

The event data generating section 71 monitors the states of hardware and software, and generates information indicating the states as event data. The event data generating section 71 transmits the generated event data to the operation management apparatus 41. The state of the service system 1 indicated by each individual piece of event data will be referred to as an event.

The event accumulation section 7 is a storage unit that stores event data that is successively generated according to changes of the operating state of the service system 1.

The event data acquisition section 2 receives the event data that is successively generated and transmitted by the event data generating section 71, and stores the received event data into the event accumulation section 7. When the event data acquisition section 2 receives new event data from the service system 1, the event data acquisition section 2 outputs the event data to the event analysis section 4.

The decision condition accumulation section 3 is a storage unit that stores operation rule information. The operation rule information defines conditions for extracting event data from a large number of pieces of event data.

The event analysis section 4 refers to the operation rule information to extract event data that matches a condition. The event data to be extracted is event data that the administrator would like to monitor. What event data to extract is defined by the administrator in advance. Examples of the event data to be extracted include event data that indicates a precursory state of a fault, event data that indicates the occurrence of a fault, and event data that indicates an item to be checked periodically. The conditions for extracting event data that is previously defined to be the event data to be extracted are determined by the administrator, and operation rule information that indicates the conditions is created by the administrator. The decision condition accumulation section 3 stores the operation rule information.

When event data is input from the event data acquisition section 2, the event analysis section 4 refers to the operation rule information stored in the decision condition accumulation section 3 and decides whether or not the event data matches the conditions defined by the operation rule information. The operation rule information sometimes describes processing to be performed when there is event data that matches a condition. Note that the operation rule information sometimes includes no description of such processing.

The event analysis section 4 outputs the result of analysis (the result of decision) to the user interaction section 5. Here, the event analysis section 4 also outputs to the user interaction section 5 the event data that is decided to match a condition and the operation rule information that is used for making the decision.

The user interaction section 5 includes input devices such as a keyboard and a mouse, and a display unit, for example. The user interaction section 5 displays information to the administrator of the service system 1, and accepts operations from the administrator.

For example, the user interaction section 5 displays the result of analysis from the event analysis section 4, the event data that is decided to match the condition, and the operation rule information that is used for making the decision. The user interaction section 5 modifies the operation rule information stored in the decision condition accumulation section 3 according to interactive inputs from the administrator. The user interaction section 5 also outputs a control instruction on the service system 1 to the control section 6 according to interactive inputs from the administrator.

The control section 6 controls the service system 1 based on the control instruction from the user interaction section 5.

Next, the event data will be described. FIG. 26 is an explanatory diagram showing an example of the event data that the conventional operation management apparatus 41 illustrated in FIG. 25 receives from the service system 1 and stores. FIG. 26B shows an example of the event data. FIG. 26A shows data (hereinafter, referred to as event list) that lists pieces of event data that are acquired in succession along with changes of state of the service system 1.

In the example shown in FIG. 26, each individual piece of event data includes: a number for uniquely identifying the event data acquired; information that indicates the type of the event data; the date and time of occurrence; information that indicates the source hardware or software; ID that indicates the format of the event data; a user name involved in the occurrence of the event; and a supplemental description of the event. The event data may also include other information. The event list 100 illustrated in FIG. 26 is information that lists the foregoing information (the pieces of information such as the number) extracted from each piece of event data. It should be noted that the event data need not include the number, whereas the following description deals with an example where the number is included for convenience's sake. The number for uniquely identifying event data is added to the event data that is received by the event acquisition data section 2.

The event data 101 illustrated in FIG. 26B shows an example of description of the event data that has number E9005 among the pieces of event data shown in the event list 110. The present example deals with the case where the event data 101 is a text file in which the names of attributes that indicate the state of the service system, such as TYPE and SERVER, and the values thereof (attribute values) are linked by equal signs (=).

The event list 100 is generated by interpreting the description of the names of the respective attributes and the values thereof included in the event data. More specifically, the event data acquisition section 2 can create an event list by extracting the values of the respective attribute values such as TYPE and SERVER from the received event data, establishing association between the values of the respective attribute values such as TYPE that are extracted from a single piece of event data, and adding the values to the event list 100 from one piece of event data to another.

In the example shown in FIG. 26, the type in the event list is created from the TYPE attribute of the event data. The date and time field in the event list is created from DATE1 (date) and TIME1 (time) of the event data. The source field in the event list is created from SERVER and SOURCE of the event data. Similarly, the user in the event list is created from USER of the event data.

In FIG. 26, the character string "Information" in the event list is derived from "INFORMATION" that is written as the TYPE attribute of the event data 101, and included into the event list. Character strings corresponding to the attribute values of the respective attributes included in such event data 101 may be defined in advance so that those character strings are included in the event list.

While FIG. 26 illustrates event data that indicates typical items for indicating the state of a computer, the event data may contain other information. The event data indicates the state of the service system 1 with the attributes and the values of the attributes in association with each other. The event data may be either data in a text format or data in a binary format.

The event data acquisition section 2 may store all the received event data into the event accumulation section 7 as event-specific files such as illustrated in FIG. 26B. Otherwise, the event data acquisition section 2 may create the event list of table form illustrated in FIG. 26A from all the event data received, and store the pieces of event data into the event accumulation section 7 in the form of the event list. The following description deals with an example where the event data acquisition section 2 stores the pieces of event data into the event accumulation section 7 in the form of an event list.

FIG. 27 is an explanatory diagram showing an example of the operation rule information and filter information that are stored in the decision condition accumulation section 3. FIG. 27A shows an example of the operation rule information. FIG. 27B shows an example of the filter information. The filter information is information that indicates the condition of event data for the event analysis section 4 to extract.

The condition under which the event analysis section 4 extracts event data is not necessarily be defined by only a single piece of filter information, but the condition is sometimes defined by a plurality of pieces of filter information. In the operation rule information, the condition under which the event analysis section 4 extracts event data is written as a single piece or a combination of a plurality of pieces of filter information. A single piece or a combination of a plurality of pieces of filter information that is/are written as the condition to extract event data in the operation rule information will be referred to as a combined condition.

A single piece or a combination of a plurality of pieces of filter information may be directly written in the operation rule information, whereas description will be given of an example where identification information on the filter information is written in the operation rule information as a combined condition. The filter information is created by the administrator in advance, and stored in the decision condition accumulation section 3.

Like the event data, the filter information includes attributes such as "SOURCE" and the values of the attributes. Note that attribute values need not necessarily be defined for all the attributes included in the filter information.

In filter information 202 illustrated in FIG. 27B, the attribute "SOURCE," which indicates a piece of software, has an attribute value "BIZAP," business software. The attribute "EVENTID," which indicates the ID of the format of the event data, has an attribute value "8000." The other attributes have no attribute value defined. If all the values of the attributes defined in the filter information match those of the attributes included in the event data, the event analysis section 4 decides that the event data satisfies the condition shown by the filter information.

As illustrated in FIG. 27A, each piece of operation rule information belonging to the group of operation rules (set of operation rule information) 200 includes: a number that identifies the operation rule information; a combined condition; the processing content to be performed when the event data is decided to match the condition; and a description of the operation rule.

For example, in the group of operation rules 200 illustrated in FIG. 27A, the operation rule information that is numbered R0120 shows that a command Mig($F0012.SOURCE,$SV (NOUPDATE)) will be executed as an action if the results of decision between the event data and the condition F0011 (see filter information 201 shown in FIG. 27) and the condition F0012 (see filter information 202) both are true, i.e., the event data matches both the conditions F0011 and F0012.

The operation rule information R0120 illustrated here provides a rule for detecting event data that is generated when business software on a computer included in the service system 1 causes a failure after automatic update of the software. The operation rule information R0120 also describes a command that moves the business software to another computer that is not updated.

The condition F0011 shown in the filter information 201 is that "the SOURCE attribute value in the event data is 'updater' and the EVENTID attribute value is 4001." Consequently, when such event data is detected, the event analysis section 4 decides that the event data matches the condition F0011 (the decision on the condition F0011 is true).

An example of the event data that matches the condition F0011 is the event data E9002 shown in FIG. 26. The condition F0012 shown in FIG. 27 is that "SOURCE in the event data is 'BIZAP' and EVENTID is '8000.'" For example, the event data E9004 illustrated in FIG. 26 matches such a condition. Consequently, for example, when the event data E9004 shown in FIG. 26 is input from the event data acquisition section 2, the event analysis section 4 decides that the event data matches the condition F0012 (the decision on the condition F0012 is true).

The foregoing condition F0011 is a condition for extracting event data that indicates that software was updated. The condition F0012 is a condition for extracting event data that indicates that business software called BIZAP resulted in an error.

The operation rule information R0120 which has the conditions F0011 and F0012 as its combined condition (see FIG. 27A) shows the action to move (Mig( )) the business software described in the SOURCE attribute value of the event data that matches the condition F0012 ($F0012.SOURCE) to a computer having the NOUPDATE attribute value that indicates the absence of update ($SV(NOUPDATE)).

Here, a character string with a leading $ symbol represents a variable, which shows that the value of the information is determined by the actual event data or an additional processing function when the event analysis section 4 makes a decision on the operation rule information. The value determined by an additional processing function refers to a value that is determined by other than event data, such as "the current time." Hereinafter, description will be given on the assumption that the $ symbol represents a variable.

Now, the operation rule information R0130 shows that a command MailTo(operator) will be executed as an action if the event data matches not-shown filter information F0013 for detecting a job failure. "MailTo(operator)" is a command to send a mail notification to the administrator.

As described above, the operation rule information shows actions to be taken when event data is decided to match combined conditions.

In FIG. 27A, the operation rule information is exemplified by general rules written in an if-then form. The operation rule information is not limited to such rules. For example, information may be extracted by using a typical structural analysis method such as regular expressions, instead of filter information written as combined conditions.

When the service system 1 is only subjected to state monitoring, the action field is sometimes omitted since the actions are limited to administrator notifications and screen display. Moreover, descriptions for promoting understanding are sometimes omitted if skilled administrators alone are intended. In any case, it is only essential that the event data showing the state of the service system 1 can be analyzed. That is, it is only necessary that whether or not the event data matches a condition can be decided to extract matching event data.

The event analysis section 4 includes an internal memory, and stores in the memory information (hereinafter, referred to as analysis state table) that associates the number for identifying each individual piece of filter information (filter number) with the number of operation rule information that describes the filter number as combined conditions.

If event data that matches filter information specified by a filter number is input to the event analysis section 4, the event analysis section 4 adds the number of the event data to the analysis state table in association with the filter information.

FIG. 28 shows examples of the analysis state table which the event analysis section 4 retains in the internal memory or the like. FIG. 28 shows an example of change of the analysis state table when the event data shown in FIG. 26 is successively input to the event analysis section 4 and the event analysis section 4 performs analyses (decision processing as to whether or not the event data matches the condition).

As shown in FIG. 28, the analysis state table lists the numbers of the respective pieces of filter information that are written as combined conditions in the group of operation rules 200 and the numbers of the pieces of operation rule information that describe the numbers of the pieces of filter information in association with the respective numbers of the pieces of filter information. If there is event data that matches filter information, the number of the event data is also added to the analysis state table in association with the filter information. Note that the group of operation rules 200 can be searched for filter information by each individual piece of operation rule information.

The analysis state table shown in FIG. 28, on the other hand, is information that lists all the numbers of the pieces of filter information, and is used to identify an operation rule from filter information. For example, referring to the row of the filter number F0011 in the analysis state table 301 shown in FIG. 28, the filter information is associated with the rule numbered R0120 in the group of operation rules 200 shown in FIG. 27.

This makes it possible to search for the operation rule information R0120 that includes the filter number F0011 in its combined condition. The row of the filter number F0011 in the analysis state table 301 shown in FIG. 28 also associates the event data E9002. This shows that the event data E9002 exists as event data that matches the filter information having the filter number F0011.

When the event data E9002 is input from the event data acquisition section 2, the event analysis section 4 performs matching with the filter information from the top of the table in order. That is, the event analysis section 4 decides whether or not the event data matches the filter information with respect to each filter number written in the analysis state table. If it is determined that the event data matches the filter information, the event analysis section 4 writes the number of the event data into the analysis state table in association with the number of the filter information that is decided to match. From the number of the event data written in the analysis state table, it is possible to identify the event data to be subjected to a decision whether or not to match the combined condition of the corresponding operation rule information.

FIG. 29 is a flowchart showing an example of the operation of the event analysis section 4 in the conventional operation management apparatus illustrated in FIG. 25. Hereinafter, the operation of the conventional operation management apparatus will be described with reference to FIGS. 25 to 29.

A group of operation rules and filter information are input to the user interaction section 5 by the administrator in advance. The user interaction section 5 stores the group of operation rules and the filter information into the decision condition accumulation section 3. Here, description will be given of an example where the group of operation rules 200 shown in FIG. 27A and a set of filter information including the filter information 201 and 202 shown in FIG. 27B are stored in the decision condition accumulation section 3.

The event data generating section 71 of the service system 1 detects the operating state of the service system 1 and generates event data successively, and transmits the event data to the operation management apparatus 41. Receiving the event data from the service system 1, the event data acquisition section 2 stores the event data into the event accumulation section 7 and outputs the event data to the event analysis section 4.

The event analysis section 4 accepts event data from the event data acquisition section 2. If there is no event data input, the event analysis section 4 waits for the input of event data (step S701).

If the event data is input from the event data acquisition section 2 (Yes at step S701), the event analysis section 4 decides whether or not filter information that is described as a combined condition by operation rule information included in the group of operation rules 200 matches the event data, for example, by the following way.

The event analysis section 4 refers to the analysis state table illustrated in FIG. 28 to decide the presence or absence of filter information that has not been decided whether or not to match the event data among the pieces of filter information whose filter numbers are listed in the analysis state table (step S702). If there is any filter information that has not been decided whether or not to match the event data (Yes at step S702), the event analysis section 4 decides whether or not one of the pieces of filter information and the event data match (step S703).

If the result of decision at step S703 is that the filter information and the event data do not match (No at step S704), the event analysis section 4 proceeds to step S702 to repeat the operation of step S702 and subsequent steps. If there is no filter information that has not been decided whether or not to match the event data (No at step S702), the event analysis section 4 proceeds to step S701 to wait for the input of new event data.

If the result of decision at step S703 is that the filter information and the event data match (Yes at step S704), the event analysis section 4 records the number of the input event data in the analysis state table in association with the filter number of the filter information that is decided to match (step S705).

For example, when the event data E9002 shown in FIG. 26A is input from the event data acquisition section 2 and the event data E9002 is decided to match the filter information 201 which is specified by the filter number F0011, the event analysis section 4 records E9002 in the analysis state table in association with the filter number F0011 (step S705). The analysis state table 301 shown in FIG. 28 shows such a state.

The event analysis section 4 further identifies the operation rule information from the filter number of the filter information that matches the event data, and decides whether or not the event data satisfies the combined condition of the operation rule information (step S706).

If the result of decision at step S706 is that the event data does not satisfy the combined condition (No at step S707), the event analysis section 4 proceeds to step S701 to wait for the input of new event data. On the other hand, if the result of decision at step S706 is that the event data satisfies the combined condition (Yes at step S707), the event analysis section 4 performs the action specified by the operation rule information that is identified at step S706 (step S708). The number of the event data input to the event analysis section 4 is then deleted from the analysis state table (step S709).

For instance, when the processing of step S705 is performed as in the foregoing example, the event analysis section 4 identifies the rule number R0120 corresponding to the filter number F0011 from the analysis state table 301, and decides whether or not the event data satisfies the combined condition of the operation rule information "F0011 AND F0012" (step S706).

Referring to the analysis state table 301 where the event data E9002 is input to the event analysis section 4, F0011 is true since there is recorded the corresponding event data, but F0012 is false since there is recorded no corresponding event data. The combined condition of the operation rule information R0120 is thus false. That is, the event data E9002 does not satisfy the combined condition of the operation rule information R0120 (No at step S707). The event analysis section 4 therefore proceeds to step S701 to wait for the input of new event data.

After the foregoing operation illustrated, if the event data E9003 (see FIG. 26) is input to the event analysis section 4 (Yes at step S701), the event analysis section 4 identifies the filter information that matches the event data E9003 (steps S702 to S704). Suppose here that the event data E9003 and the filter information having the filter number F0010 match. Then, the event analysis section 4 records E9003 in association with F0010 (step S705).

Subsequently, the event analysis section 4 identifies the operation rule information R0110 corresponding to F0010, and decides whether or not the event data E9003 satisfies the combined condition of the operation rule information (step S706). Since the combined condition of the operation rule information R0110 includes F0010 alone (see FIG. 27A), the event data E9003 satisfies the combined condition which consists of F0010 (Yes at step S707).

It follows that the event analysis section 4 performs the action of the operation rule information (step S708), whereas no processing will be performed since the operation rule information R0110 includes no description of corresponding actions (see FIG. 27A).

Since the decision on the condition of the operation rule information is completed, the event analysis section 4 then deletes the corresponding event (here, E9003) from the analysis state table (step S709), and proceeds to step S701. The analysis state table at the point in time is the same as the analysis state table 301 shown in FIG. 28.

Now, the event data E9004 is similarly input to the event analysis section 4. If it is decided that the event data and the filter information having the filter number F0012 match (steps S701 to S704), the event analysis section 4 records E9004 in the analysis state table as a corresponding event (step S705). That is, the number E9004 of the event data is stored in association with F0012.

This transforms the analysis state table 301 into the analysis state table 302 shown in FIG. 28. The event analysis section 4 also identifies the operation rule information R0120 corresponding to F0012, and decides whether or not the event data E9003 satisfies the combined condition of the operation rule information (step S706). The decision on the condition here results in true (Yes at step 707) since F0011 and F0012 both have corresponding events in the analysis state table 302 (see FIG. 28).

The event analysis section 4 therefore performs an action on the service systems 1 through the user interaction section 5 and the control section 6 (step S708), and deletes the corresponding events (E9002 and E9004) corresponding to the operation rule information R0120 (step S709). This transforms the analysis state table 302 into the analysis state table 303 shown in FIG. 28.

The event data E9005 shown in FIG. 26A is event data that indicates the result of the action performed thus, and matches the combined condition of the operation rule information R0110.

The event analysis section 4 may create a list that includes pieces of event data that match the combined conditions of the operation rule information among the event data, and store the list in the event accumulation section 1. In such mode, the list is created in the same format as that of the event list shown in FIG. 26A.

When a list of pieces of event data that match the combined conditions of the operation rule information is thus created, the event analysis section 4 presents the list to the administrator through the interaction section 5. The administrator can refer to the event data E9005 in the list to know that the failure has been automatically handled.

In cases such as when a failure is found against which no action is specified by the operation rule information, it is possible to give a control instruction to the control section 6 through the user interaction section 5 and to manually handle the failure. Note that all the event data received by the event data acquisition section 2 is stored in the event accumulation section 1 in the form of respective files or an event list. Such event data (event list) can be displayed on the user interaction section 5 so that the administrator can check the detailed information.

As described above, the operation management apparatus of the related art shown in FIG. 25 specifies in the operation rule information the combined conditions for extracting successively-occurring event data, so that it is possible to monitor and take actions against abnormal states of the service system 1 that are assumed in advance. This reduces the operation burdens of the administrator significantly as compared to the case of manually monitoring and handling a large number of devices. The automation also allows constant monitoring and handling irrespective of the experience and skills of the administrator, thereby improving the quality of the operation management.

Patent Document 2 describes a performance monitoring method that includes the step of predicting the possibility of occurrence of a future fault in an information processing system.

Patent Document 1: JP-A-2006-244404
Patent Document 2: JP-A-2005-327261 (paragraph 0009)

SUMMARY OF INVENTION

Technical Problem

In the operation management apparatus of the related art, the event analysis section 4 extracts event data that matches the combined conditions of the operation rule information from among the input event data. Since the combined conditions are written as combinations of pieces of filter information, the event data is subjected to the decision whether or not to match each piece of filter information irrespective of the time series even if the temporal order of occurrence of the event data is known in advance.

To decide which piece of filter information the event data input to the event analysis section 4 matches requires matching with all the filter information, and there has thus been a problem of high processing load.

For example, the foregoing operation rule information R0120 has a combined condition of F0011 and F0012. Even when it is known that the occurrence of event data that matches F0011 is followed by the occurrence of event data that matches F0012, the matching is performed on all the filter information event by event. In order to discover the correspondence shown in the analysis state table 302 at the point in time when the event data E9004 occurs (the correspondence between E9004 and F0012), it has therefore been needed to repeat matching successively, even including the matching with the filter information F0011 which has previously matched with E9002.

In large-scale environment where the service system includes a large number of devices in particular, the automated operation management by using an operation management apparatus is the most desired since manual operation management is difficult. The operation management apparatus of the related art, however, has had the problem of being difficult to apply to such environment since the pieces of operation rule information and the combinations of pieces of filter information to be specified as conditions thereof both are large in number, which increases the processing load dramatically.

In the operation management apparatus of the related art, a plurality of filter conditions are specified as a combined condition of operation rule information, and an action is taken when a plurality of pieces of event data that match the filter conditions are detected. Here, the filter conditions for identifying the respective pieces of event data are indistinguishable from environment-dependent filter conditions that are dependent on the properties of the service system, such as relationship between the sources and temporal order.

In the foregoing example, the sources of the event data E9002 and the event data E9004 are the same SV3 (see FIG. 26A). The condition of the operation rule information R0120 is true even if these sources are different. The reason is that the filter information illustrated includes no description for identifying the source SERVER (see FIG. 27B).

Even when a description for identifying the source is added to the filter information, it depends on the properties of the service system 1 whether the condition should be true only if the sources are the same or may be true under a certain condition if the sources are different. For example, considering the main purpose of its provision, the operation rule information R0120 is intended to identify situations where a computer on which business software is running is updated. If the system is constructed of independent computers, the condition should apply only when the sources are the same. If a plurality of computers cooperate for load balancing or the like, the computers should be distinguished whether cooperative or not.

Consequently, since the conditions that are dependent on the environment and the conditions that are little dependent (may be regarded as invariable) are not distinguishable, a large number of environment-dependent conditions need to be written in the filter information according to series of event data that can actually occur. This complicates the description of the conditions and lowers the readability, and there has been the problem that it is difficult for the administrator to set appropriate operation rule information. This also makes the application to other similar systems difficult, and there has been the problem that the administrator needs to make more adjustment operations for each individual service system.

Suppose, for example, that filter information A and B is specified as the combined condition of operation rule information P, and filter information A and C is specified as the combined condition of other operation rule information Q. Suppose also that the operation rule information P is intended to extract pieces of event data that match the filter information A and B, respectively, from an identical source server, and the operation rule information Q is intended to extract pieces of event data that match the filter information A and C irrespective of whether or not the source servers are identical. In this case, the description of the filter information A becomes complicated and the filter information drops in readability.

As has been described, the operation management apparatus of the related art has had the problem of inapplicability to large-scale environment due to high processing load. There has also been the problem that the increased volume of environment-dependent descriptions prevents setting appropriate operation rule information.

Which filter condition the occurring event data matches has been decided by performing matching with all the filter information, with the problem of high processing load. In particular, in large-scale environment where the service system includes a large number of devices, there has been the problem that the pieces of operation rule information and the combinations of pieces of filter information to be specified as conditions thereof both become large in number, which increases the processing load dramatically.

Furthermore, a large number of environment-dependent conditions need to be written in the filter information according to series of event data that can actually occur, which complicates the description of the conditions and lowers the readability. There has thus been the problem that it is difficult for the administrator to set appropriate operation rule information.

It is thus an object of the present invention to provide an operation management apparatus, an operation management method, and an operation management program that can reduce the processing load when deciding whether or not event data matches conditions, thereby analyzing the event data quickly. Another object is to provide an operation management apparatus, an operation management method, and an operation management program that can make a distinction between conditions for identifying respective pieces of event data and conditions that are dependent on the properties of a service system, so that the administrator can easily understand and appropriately set the operation rule information.

Solution to Problem

An operation management apparatus according to the present invention is an operation management apparatus for performing processing when event data matches a defined condition, the event data associating a name of an attribute indicating a state of a system to be managed with an attribute value of the same, the apparatus including the following rule storing section, individual filter information storing section, predictive event data storing section, predictive event index storing section, predictive event correspondence table storing section, predictive event data matching decision section, individual filter information identification section, predictive event data generating section, and rule decision section.

The rule storing section stores operation rule information that defines processing to be performed.

The individual filter information storing section stores individual filter information which is information that constitutes conditions defined for respective pieces of operation rule information and that associates attributes and attribute values, where some of the attribute values may be written as a reference value estimated from past event data and some of the attribute values may be written as a variable.

The predictive event data storing section stores predictive event data which is data in which an attribute value of event data generated by the system to be managed is substituted for an attribute value that is written as a variable in individual filter information. The predictive event index storing section stores a predictive event index which is information that associates: generated event data; predictive event data generated from individual filter information that matches the event data; and a group which is a set of individual filter information corresponding to operation rule information and to which the individual filter information matching the event data belongs.

The predictive event correspondence table storing section stores a predictive event correspondence table which is information that associates operation rule information, each piece of individual filter information that constitutes a condition defined by the operation rule information, a group to which each piece of individual filter information belongs, and predictive event data generated from the individual filter information.

The predictive event data matching decision section decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values.

The individual filter information identification section identifies individual filter information whose attribute values, excluding a reference value or reference values, match the attribute values of the event data if it is decided that the event data and the predictive event data do not match.

The predictive event data generating section, if the individual filter information is successfully identified, substitutes the attribute value of the event data for the variable of each piece of individual filter information that belongs to a group to which the individual filter information belongs, thereby generating predictive event data for each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, each piece of individual filter information belonging to the group, and the operation rule information having each piece of individual filter information as a condition into the predictive event correspondence table storing section.

The rule decision section decides, after the predictive event data is generated by the predictive event data generating section, whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

Advantageous Effects of Invention

The present invention uses individual filter information which is information that constitutes conditions defined for respective pieces of operation rule information and that associates attributes and attribute values, where some of the attribute values may be written as a reference value estimated from past event data and some of the attribute values may be written as a variable. The present invention also uses predictive event data that is data in which the attribute values of event data generated by the system to be managed are substituted for the attribute values that are written as variables in the individual filter information. Moreover, the present invention includes the above-mentioned predictive event index storing section, predictive event correspondence table storing section, and predictive event data matching decision section. Consequently, it is possible to set rule conditions suited to the environment and enhance the precision of the rule conditions.

Since the predictive event data matching decision section decides whether or not event data matches predictive event data which has a similar form to that of the actually-occurring event data, it is easy to describe correlations between a plurality of pieces of event data, so that event data that is expected to occur in advance can be processed by priority. The processing speed can thus be improved significantly as compared to the operation management apparatus of the related art where all the condition expressions need to be compared. This results in applicability to environment that has a lot of rule conditions such as a large-scale environment.

Moreover, since the predictive event data is generated by developing environment-dependent conditions such as correlationships into specific values, it is possible to detect differences from the predicted values and present the differences to the administrator to prompt actions, for example, when the device configuration or software behavior is changed. This makes it possible to support the activities of following environmental changes and sophisticating the operation rule information for efficient operation.

BRIEF DESCRIPTION OF DRAWINGS

FIG. 3 is an explanatory diagram showing examples of individual filter information according to the first exemplary embodiment.

FIG. 4 is an explanatory diagram showing examples of the predictive event data according to the first exemplary embodiment.

FIG. 6 is an explanatory diagram showing an example of event data extracted at step S601 shown in FIG. 5.

FIG. 7 is an explanatory diagram showing examples of the event data according to the first exemplary embodiment.

FIG. 15 is an explanatory diagram showing examples of individual filter information according to the first exemplary embodiment.

FIG. 16 is an explanatory diagram showing examples of modified filter information according to the first exemplary embodiment.

FIG. 17 is an explanatory diagram showing examples of modified individual filter information according to the first exemplary embodiment.

FIG. 18 is an explanatory diagram showing examples of modified predictive event data according to the first exemplary embodiment.

FIG. 20 is an explanatory diagram showing an example of the event data according to the second exemplary embodiment.

FIG. 22 is an explanatory diagram showing an example of transition of the predictive event index according to the second exemplary embodiment.

FIG. 25 is a block diagram showing a configuration example of the operation management apparatus according to the related art.

FIGS. 26A and 26B are explanatory diagrams showing an example of event data according to the related art.

FIGS. 27A and 27B are explanatory diagrams showing an example of operation rule information and filter information according to the related art.

EXPLANATION OF REFERENCE SYMBOLS

Figure 1:
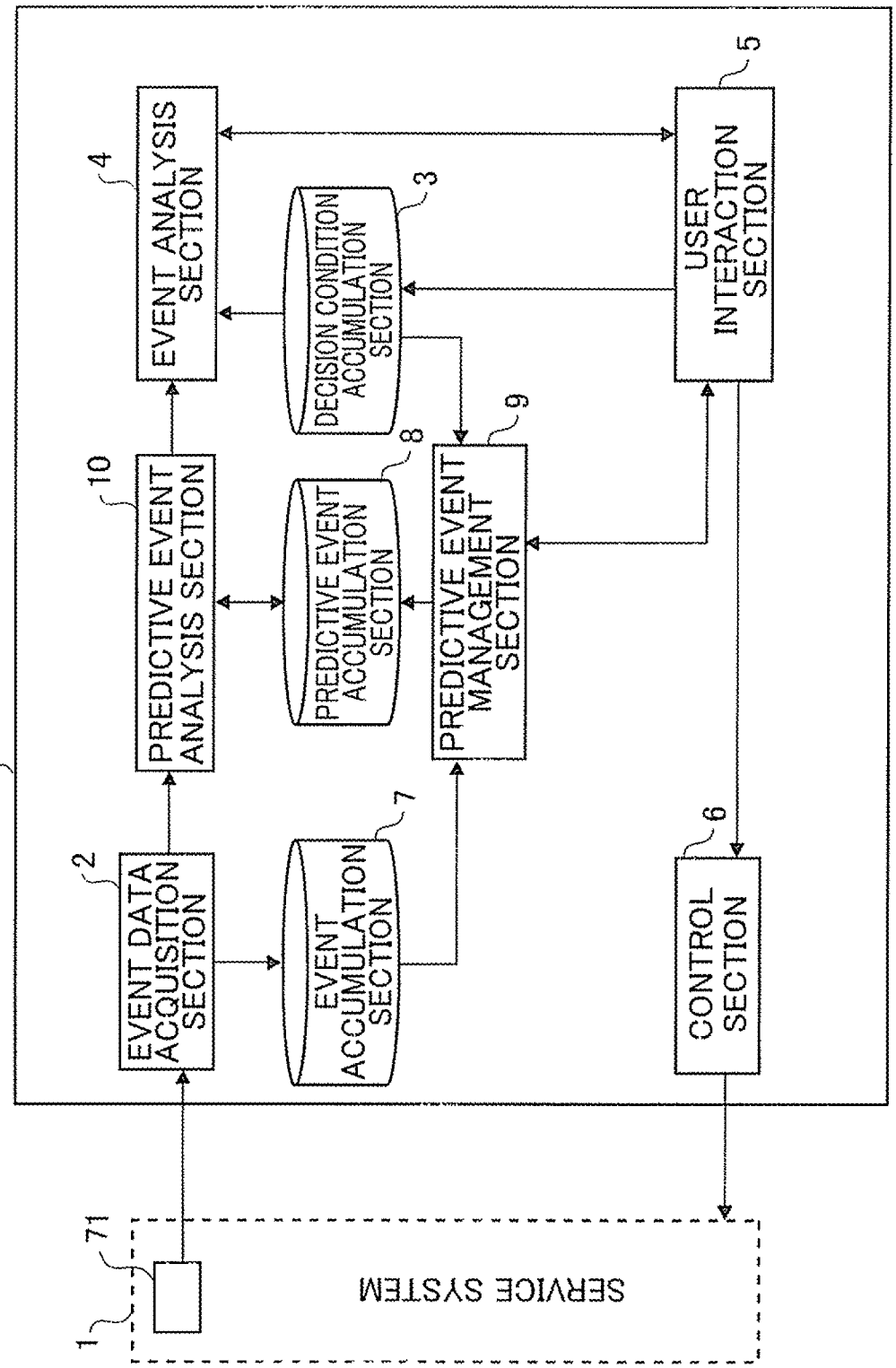
FIG. 1 is a block diagram showing the configuration of an operation management apparatus according to a first exemplary embodiment of the present invention.

2: Event data acquisition section
3: Decision condition accumulation section
4: Event analysis section 5: User interaction section
6: Control section
7: Event accumulation section
8: Predictive event accumulation section
9: Predictive event management section
10: Predictive event analysis section
11: Job management section
31: Operation management apparatus

DESCRIPTION OF EMBODIMENTS

Hereinafter, an operation management apparatus, an operation management method, and an operation management program according to exemplary embodiments of the present invention will be described with reference to the drawings.

First Exemplary Embodiment

FIG. 1 is a block diagram showing the configuration of an operation management apparatus according to a first exemplary embodiment of the present invention. The same components as those of the operation management apparatus 41 of the related art shown in FIG. 25 will be designated by the same reference symbols as in FIG. 25, and description thereof will be omitted.

The operation management apparatus 31 of the present exemplary embodiment shown in FIG. 1 includes a predictive event accumulation section 8, a predictive event management section 9, and a predictive event analysis section 10 in addition to the event data acquisition section 2, the event accumulation section 7, the event analysis section 4, the decision condition accumulation section 3, the user interaction section 5, and the control section 6 of the operation management apparatus according to the related art shown in FIG. 25.

The predictive event accumulation section 8 is a storage unit that stores individual filter information which is filter information managed with respect to each piece of operation rule information stored in the decision condition accumulation section 3, and predictive event data which shows event data expected to occur in the future. As employed herein, being managed with respect to each piece of operation rule information refers to being provided for each individual piece of operation rule information.

For example, in the operation management apparatus of the related art, a single piece of filter information has sometimes been specified as combined conditions of a plurality of pieces of operation rule information. In the present exemplary embodiment, individual filter information corresponds to only a single piece of operation management information. As shown in a predictive event correspondence table to be described later (see FIG. 8), the individual filter information is associated with the operation rule information.

Figure 8:
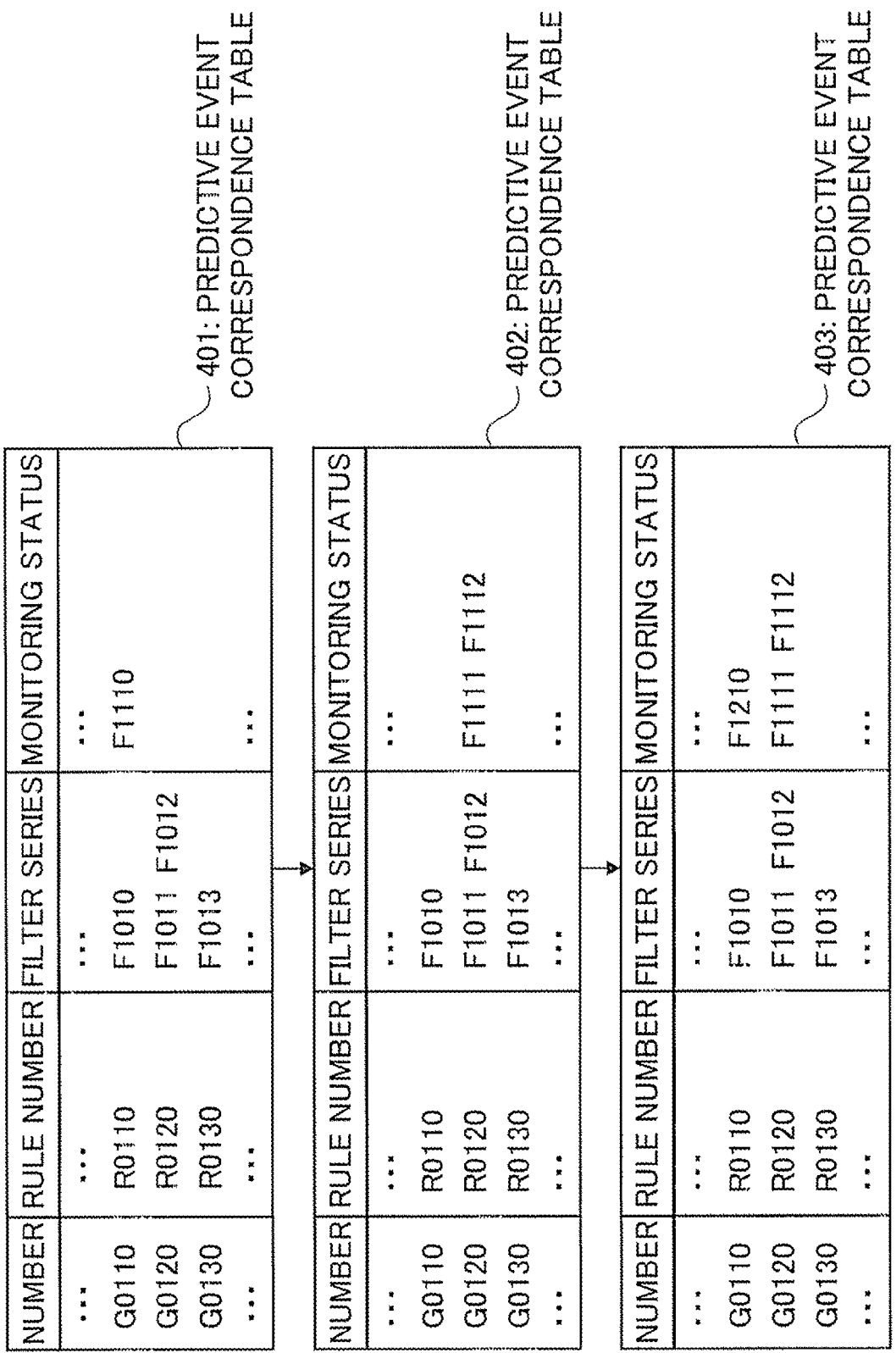
FIG. 8 is an explanatory diagram showing examples of a predictive event correspondence table according to the first exemplary embodiment.

In the example shown in FIG. 8, for example, individual filter information F1011 and F1012 is associated with operation rule information R0120. The pieces of individual filter information F1011 and F1012 each correspond to the operation rule information R0120 alone, not being associated with other operation rule information. Examples of the individual filter information and predictive event data will be given later.

The predictive event management section 9 generates individual filter information from filter information that is specified by combined conditions of respective pieces of operation rule information stored in the decision condition accumulation section 3 and a history of past event data that is stored in the event accumulation section 7, and stores the individual filter information into the predictive event accumulation section 8. An example of the operation for generating the individual filter information will be given later.

It should be noted that the filter information to be specified by the combined conditions of the operation rule information is the same information as the filter information in the operation management apparatus of the related art. Instead of the predictive event management section 9 generating the individual filter information from the filter information, an administrator may input the individual filter information to the predictive event management section 9 through the user interaction section 5 so that the predictive event management section 9 stores the administrator-input individual filter information into the predictive event accumulation section 8.

When generating the individual filter information, the predictive event management section 9 may display the individual filter information on the user interaction section 5, and store modified individual filter information into the predictive event accumulation section 8 if any modification is made by the administrator. The predictive event management section 9 may thus generate the individual filter information through the interaction with the administrator.

The predictive event analysis section 10 accepts event data from the event data acquisition section 2. The predictive event analysis section 10 generates predictive event data from the individual filter information accumulated in the predictive event accumulation section 8, and stores the predictive event data into the predictive event accumulation section 8.

The predictive event analysis section 10 performs processing for deciding whether or not the input event data matches the predictive event data and the individual filter information. The predictive event analysis section 10 also outputs the result of decision to the event analysis section 4. The processing for deciding whether or not the input event data matches the predictive event data and the individual filter information corresponds to the processing of steps S721 and S723 to be described later. The details of the processing will be given later.

Aside from the functions described with reference to FIG. 25, the event analysis section 4 also has the function of accepting the result of decision from the predictive event analysis section 10 and making a decision on the operation rule information corresponding to the matching event data. Such decision processing refers to the processing of step S726 to be described later. The details of the processing will be given later. The event analysis section 4 also has the function of prompting the administrator for confirmation through the user interaction section 5 if estimated attribute values included in the predictive event data or individual filter information do not match the event data.

Figure 2:
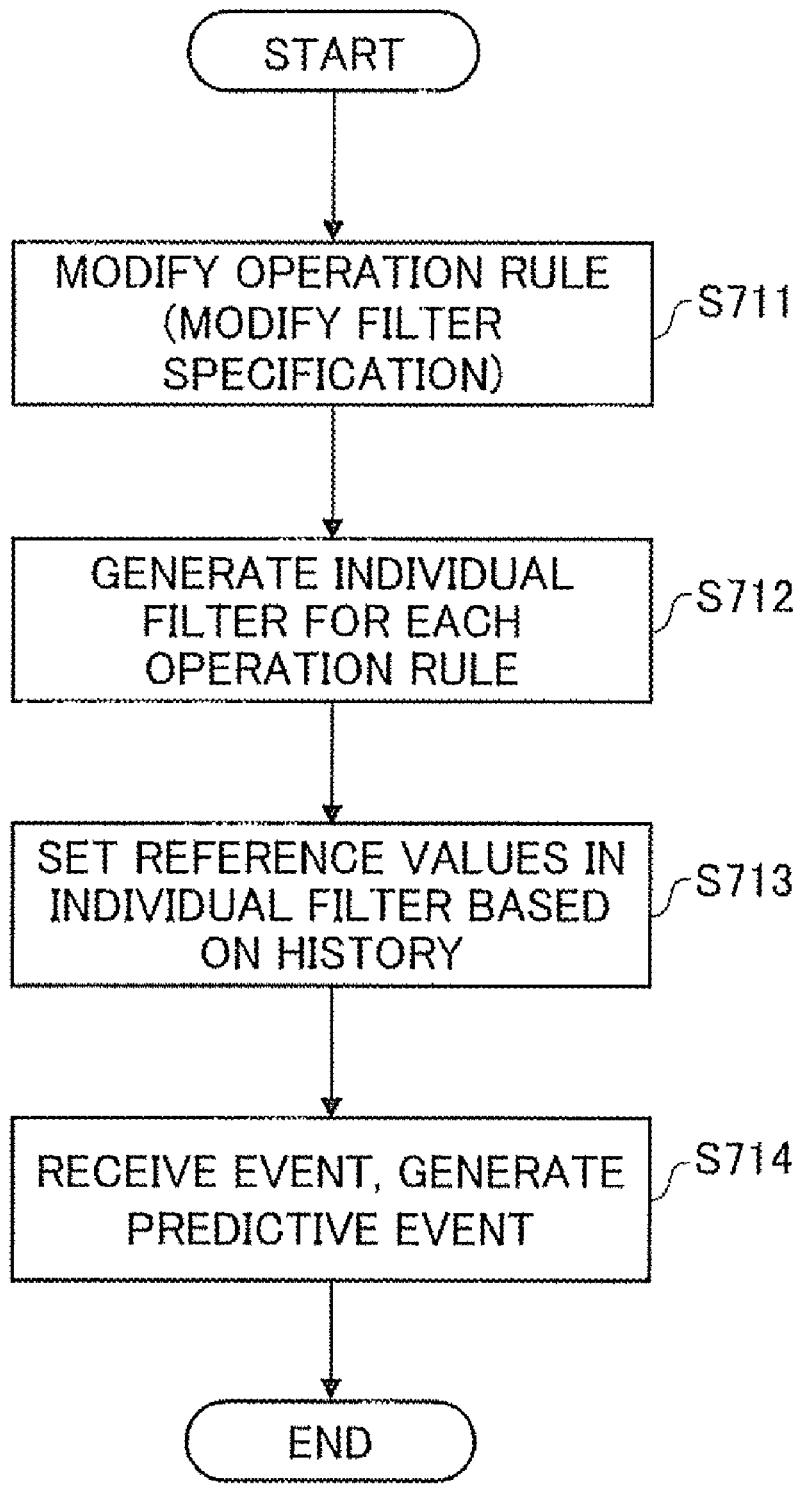
FIG. 2 is a flowchart of the operation for generating predictive event data according to the first exemplary embodiment.

FIG. 2 is a flowchart of the operation by which the operation management apparatus according to the present exemplary embodiment generates predictive event data. Hereinafter, the individual filter information and the predictive event data will be described with reference to FIGS. 3 and 4 before the description of the operation of the present invention.

FIG. 3 is an explanatory diagram showing examples of the individual filter information used in the operation management apparatus of the present exemplary embodiment. Individual filter information is information in which a reference value is added to an attribute included in filter information, the attribute having no attribute value defined. A reference value is an attribute value estimated from event data that is received from the service system 1 in the past. In the following description, an attribute value that is a reference value will be written in parenthesis marks "[" and "]". Individual filter information may be generated by adding reference values to a plurality of attributes in the filter information.

The individual filter information 211 shown in FIG. 3 shows an example of individual filter information that is obtained by adding reference values to the TIME1 (the time of occurrence of event data) attribute and the SERVER attribute of the filter information 201 shown in FIG. 27B. Similarly, the individual filter information 212 shown in FIG. 3 shows an example of individual filter information that is obtained by adding reference values to the TIME1 attribute and the SOURCE attribute of the filter information 202 shown in FIG. 27B.

Individual filter information has a number for uniquely identifying the individual filter information. For example, the individual filter information 211 contains number F1011 for the sake of distinction from the other individual filter information and filter information. In the present example, the number is changed to F1011 when the individual filter information 211 of FIG. 3 is generated from the filter information 201 of FIG. 27B.

Reference values are written by using variables, for example. In the present example, variables are represented by character strings with a leading $ symbol. In the example shown in FIG. 3, reference values are written with such variables as "$F01" and "$F02." When expressing that a plurality of pieces of event data match respective different pieces of individual filter information, the expression sometimes needs to include the condition that the attribute values in the plurality of pieces of event data have a correlation therebetween. In such cases, the same variable (or non-variable) can be written in the plurality of pieces of individual filter information.

The variables "$F01" and "$F02" shown in FIG. 3 are used in the individual filter information 211 and 212, respectively. "PERIOD($F01,*)" shown in FIG. 3 indicates being in a predetermined period from the variable $F01. The situation that a plurality of pieces of individual filter information use a common variable as a reference value and a plurality of pieces of event data match the respective pieces of individual filter information even including the reference value expressed by using the variable will be referred to as that the pieces of event data have a correlation therebetween. Reference values that are expressed by using a common variable in different pieces of individual filter information will be referred to as correlation information. In the example shown in FIG. 3, $F01, $F02, and PERIOD($F01,*) correspond to correlation information each.

Reference values may be specific values instead of variables. For example, a reference value using no variable, such as [SV4], may be added to individual filter information. Such reference values in specific values may be written in a plurality of pieces of individual filter information to express correlation.

FIG. 4 is an explanatory diagram showing examples of the predictive event data that is generated by the operation management apparatus of the present exemplary embodiment. Predictive event data is information in which variables written in individual filter information are replaced with the attribute values of event data detected. The predictive event data 221 and 222 shown in FIG. 4 is information in which the variables of the individual filter information 211 and 212 shown in FIG. 3 are replaced with attribute values in event data, respectively.

When generating predictive event data, a number for identifying the predictive event data is also written into the predictive event data. For example, the predictive event data 221 shown in FIG. 4 contains number F1111 for the sake of distinction from the other information. In the present example, the number is changed to F1111 when the predictive event data 221 of FIG. 4 is generated from the individual filter information 211 of FIG. 3.

Hereinafter, the operation for generating predictive event data according to the present exemplary embodiment will be described with reference to FIGS. 27, 1, 2, 3, and 4.

Initially, the administrator inputs an instruction for the modification of operation rule information to the user interaction section 5. According to the modification instruction (i.e., according to the operation of the administrator), the user interaction section 5 modifies the operation rule information stored in the decision condition accumulation section 3 (step S711).

At step S711, new operation rule information may be input to the user interaction section 5 so that the user interaction section 5 stores the operation rule information into the decision condition accumulation section 3. Suppose here that the combined condition of the operation rule information R0120 stored in the decision condition accumulation section 3 is modified into "F0011 AND F0012" as illustrated in FIG. 27A.

Next, the predictive event management section 9 reads the filter information 201 and the filter information 202 that are specified by the combined condition of the input operation rule information (modified operation rule information) from the decision condition accumulation section 3, and stores them into the predictive event accumulation section 8 as individual filter information (step S712). At the point in time, the individual filter information stored in the predictive event accumulation section 8 is the same as the filter information stored in the decision condition accumulation section 3.

At the next step S713, reference values are added to the individual filter information stored in the predictive event accumulation section 8. It should be noted that the operations of step S712 and step S713 to be described later are performed with respect to each piece of operation rule information.

After step S712, the predictive event management section 9 reads event data from the event accumulation section 7, and adds reference values based on the properties of the past event data that matches the individual filter information (step S713).

The attribute values of the filter information shown in FIG. 27B are values absolutely necessary for the attribute values of event data to match in order that the event data is decided to match the filter information. The reference values included in the individual filter information, on the other hand, show values that have appeared frequently in the event data occurring in the use environment of the service system 1 in the past, and have high possibilities to match.

The derivation of the reference values at step S713 can be implemented by using a typical technique for statistically analyzing past event data. Hereinafter, description will be given of the operation by which the predictive event management section 9 derives reference values at step S713. It should be appreciated that the following operation for deriving reference values is shown by way of example, and reference values may be derived by other operations.

Figure 5:
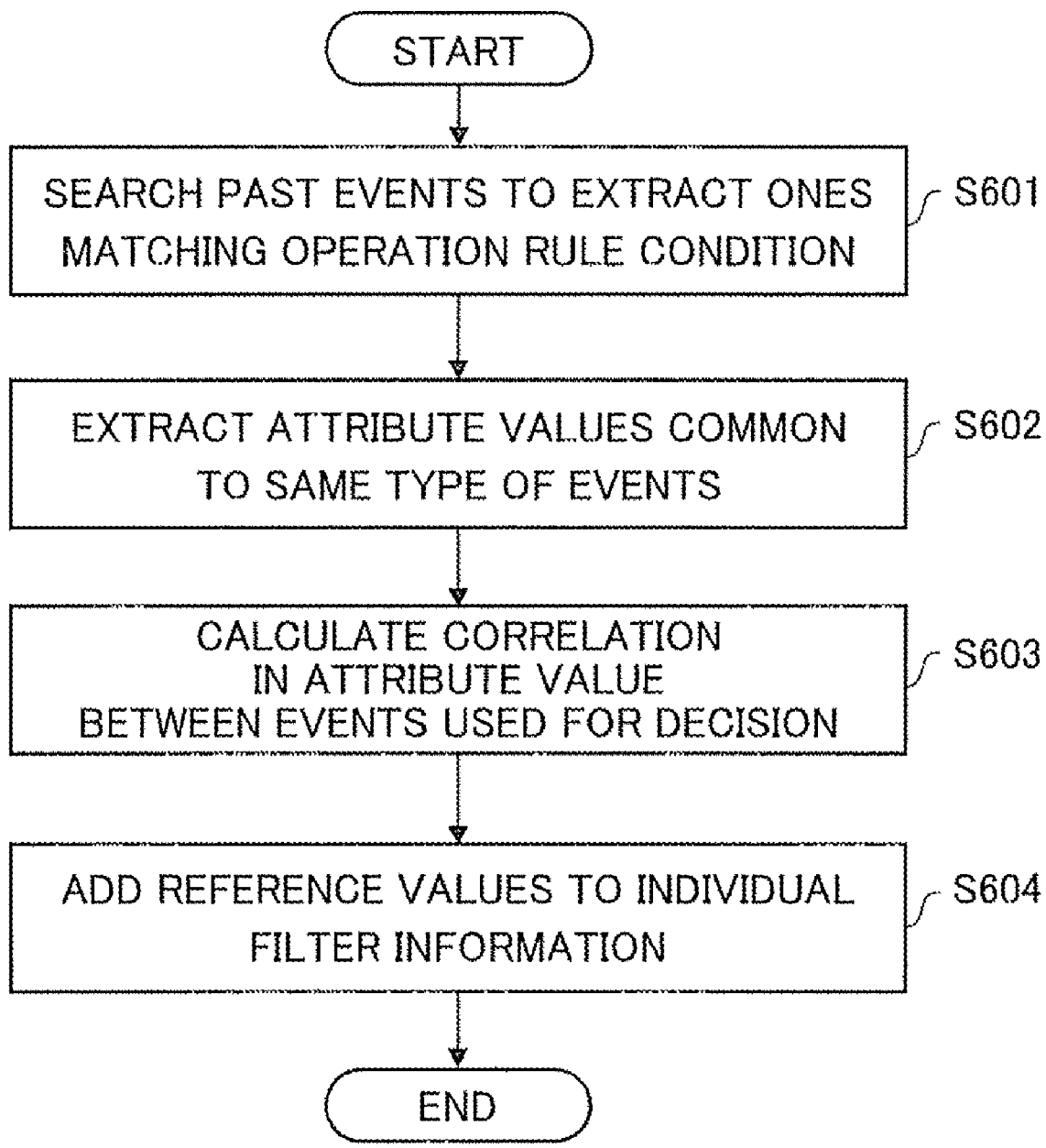
FIG. 5 is a flowchart showing an example of the transition of processing of step S713 shown in FIG. 2.

FIG. 5 is a flowchart showing an example of the transition of processing of step S713 where reference values are added to the individual filter information that is stored in the predictive event accumulation section 8 at step S712. The predictive event management section 9 extracts each piece of event data that matches the combined condition of the operation rule information that is stored in the decision condition accumulation section 3 at step S711, from the past event data stored in the event accumulation section 7 (step S601).

For example, if the operation rule information R0120 illustrated in FIG. 27A is stored into the decision condition accumulation section 3 at step S711, the predictive event management section 9 extracts event data that matches the filter information 201 and the filter information 202 (see FIG. 27B) that are specified as the combined condition of the operation rule information R0120, from the past event data stored in the event accumulation section 7. Here, the predictive event management section 9 extracts a set of event data that matches the filter conditions when the pieces of event data that match the respective pieces of filter information specified by the combined condition are retrieved successfully.

FIG. 6 is an explanatory diagram showing an example of event data that is thus extracted at step S601.

The example shown in FIG. 6 shows that pieces of event data E8010 and E8020 that match the pieces of filter information 201 and 202 specified by the combined condition of the operation rule information R0120 (see FIG. 27) are extracted. The event data E8010 and E8020 is event data that has been generated as of Jun. 6, 2006. The predictive event management section 9 extracts the set of event data E8010 and E8020 when the pieces of event data E8010 and E8020 matching the pieces of filter information 201 and 202 are retrieved.

The example shown in FIG. 6 also shows that pieces of event data E8030 and E8040 that match the pieces of filter information 201 and 202 (see FIG. 27) are extracted. The event data E8030 and E8040 is event data that has been generated as of Oct. 2, 2006. The predictive event management section 9 extracts the set of event data E8030 and E8040 when the pieces of event data E8030 and E8040 matching the pieces of filter information 201 and 202 are retrieved.

Such pieces of event data indicate that a failure occurred when the next transaction of business was started after a patch was applied at the end of the month. The event data E8010 and E8020 shows that a failure occurred when a patch was manually applied by the administrator at the end of June. The event data E8030 and E8040 shows that a failure occurred when a patch was automatically applied at the end of September.

After step S601, the predictive event management section 9 extracts attribute values that are common to the same type of event data (step S602). As employed herein, "the same type of event data" refers to pieces of event data that are decided to match the same filter information among the event data extracted at step S601.

For instance, in the example shown in FIG. 6, the pieces of event data E8010 and E8030 both are decided to match the filter information 201 shown in FIG. 27B, and thus apply to the same type of event data. Similarly, the pieces of event data E8020 and E8040 both are decided to match the filter information 202 (see FIG. 27B), and thus apply to the same type of event data.

The predictive event management section 9 extracts common attribute values from the same type of event data E8010 and E8030. More specifically, the predictive event management section 9 extracts "updater" in SOURCE which indicates the source, and "4001" in EVENTID. Note that such attribute values are values that are previously written in the filter information 201, not attribute values to be added as reference values.

The predictive event management section 9 also extracts common attribute values "BIZAP" and "8000" from the same type of event data E8020 and E8040. Again, such attribute values are values written in the filter information 202, not values to be added as reference values.

Subsequently, the predictive event management section 9 determines a correlation between the pieces of event data with respect to each of the sets of event data that are extracted as matching the combined condition, or the filter information 201 and 202 (step S603). More specifically, the predictive event management section 9 determines the correlation between the pieces of event data with respect to each pair of pieces of event data that are decided to match by a single decision on the combined condition.

The predictive event management section 9 initially compares the attribute values of the event data E8010 and E8020 to determine the correlation therebetween. The predictive event management section 9 compares the attribute values of the two pieces of event data E8010 and E8020, and identifies matching attribute values and the order between the dates and times of occurrence. The comparison result (referred to as comparison result 1) is as follows:

Match in type "unknown."
Match in date "Jun. 6, 2006."
E8010 occurred earlier in time.
Match in source server "SV2."
Match in user "root".
Match in the initial character string of the description "Manual:".

From the comparison between the attribute values of the event data E8010 and E8020, the foregoing five correlationships are found. The comparison result provides candidates for reference values.

Similarly, the predictive event management section 9 compares the attribute values of the event data E8030 and E8040 to determine the correlation therebetween. The comparison result (referred to as comparison result 2) is as follows:

E8030 occurred earlier in time.
Match in source server "SV3".

From the comparison between the attribute values of the event data E8030 and E8040, the foregoing two correlationships are found.

The predictive event management section 9 identifies common correlationships from among the correlationships obtained as the comparison result of each set of event data. In the present example, the comparison results 1 and 2 have the following correlationships in common.

The event matching the filter information 201 occurred earlier in time.
The source servers match.

The predictive event management section 9 adds the common correlationships to the individual filter information as reference values (step S604). If any attribute value that is common to the same type of event data but not written in the filter information is extracted at step S602, the predictive event management section 9 also adds the attribute value to the individual filter information as a correlation value.

When adding common correlationships to the individual filter information as reference values at step S604, the predictive event management section 9 can add reference values that are expressed by using common variables to each piece of individual filter information as far as matching items (in the foregoing example, server) are concerned. Before-and-after relationships in time can be expressed, for example, by using a common variable between the pieces of individual filter information and adding reference values with predetermined expressions such as PERIOD seen above to the filter information. While the foregoing has illustrated the case of using the expression PERIOD, equations given by combinations of variables and other calculation formulas may be added as reference values. Variables alone may be added as reference values.

FIG. 3 shows examples of the individual filter information generated as described above, where the descriptions parenthesized with "[" and "]" represent the reference values. $F01 and $F02 represent variables, which show that the information is common between the individual filter information 211 and the individual filter information 212. The present example shows that the two pieces of event data that are decided to match the combined condition of the operation rule information match in the value of the SERVER attribute, and the event data matching the individual filter information 212 has an occurring time that comes later (PERIOD($F01,*) is a processing function for indicating the period after $F01).

As described in FIG. 6, the past examples in the present execution environment include both manual execution and automatic execution, which produce different attribute values and descriptions. The track record also shows that failures resulted in event data from the same server. The reference values in FIG. 3 appropriately set such conditions dependent on the execution environment.

The method of generating reference values has been described with, but is not limited to, simple examples where the attribute values fully match and where the order relationship between the attribute values is known. Reference values may be derived by estimation using commonly known information structure analysis techniques and mining techniques.

Reference values according to techniques other than those illustrated above may be written in the individual filter information of the present invention and may be used as conditions dependent on the execution environment as long as attribute value candidates or correlationships having high probabilities of occurrence can be determined from the characteristics of past event data. The administrator may create individual filter information and input the individual filter information to the predictive event management section 9 through the user interaction section 5 so that the predictive event management section 9 stores the individual filter information into the predictive event accumulation section 8.

The predictive event management section 9 writes numbers that uniquely identify the pieces of individual filter information into the pieces of individual filter information as identification information. In the example shown in FIG. 3, numbers F1011 and F1012 are written in the individual filter information 211 and 212, respectively.

If the event data acquisition section 2 newly receives event data and outputs the event data to the predictive event analysis section 10 after the foregoing processing of adding reference values to the individual filter information, the predictive event analysis section 10 performs matching between the event data and the individual filter information stored in the predictive event accumulation section 8. If the event data matches individual filter information, the predictive event analysis section 10 generates information in which the reference values of the individual filter information are amended with the attribute values of the event data, aside from the individual filter information (step S714). Such information is predictive event data.

For example, suppose that the individual filter information 211 and 212 illustrated in FIG. 3 is stored in the predictive event accumulation section 8 at step S713. Suppose also that the event data acquisition section 2 outputs event data that matches the individual filter information 211 to the predictive event analysis section 10 in that state. The predictive event analysis section 10 then generates predictive event data in which the values of the reference values are overwritten with the attribute values included in the event data (step S714).

The predictive event data 221 shown in FIG. 4 is the predictive event data that is generated in this way. Here, if any variable included in the reference values is replaced with an attribute value of the event data, predictive event data in which the variable is replaced with the attribute value is also generated for the other pieces of individual filter information that contain the variable.

In the present example, the variables of the individual filter information 212 (see FIG. 3) are replaced to generate the predictive event data 222 (see FIG. 4). While the predictive event data 221 corresponds to the event data that has already occurred, the predictive event data 222 shows event data that has not occurred yet. The predictive event data shown in FIG. 4 shows that there is a high possibility that event data with SERVER="SV4" will be input. The operation of step S714 will be detailed later with reference to FIG. 11.

Hereinafter, description will be given of an example where event data illustrated in FIG. 7 is sent from the service system 1. The event list 110 illustrated in FIG. 7 differs from the event list 100 illustrated in FIG. 26 in that the source of event data numbered E9002 is SV4. The event list 120 illustrated in FIG. 7 is the event list 110 after a lapse of time from the generated state, including additional event data E9005 to E9008.

FIG. 8 is an explanatory diagram showing examples of a predictive event correspondence table to be used by the operation management apparatus of the present invention. The predictive event correspondence table is information that shows the correspondence between the operation rule information, the individual filter information, and the predictive event data. A group of individual filter information corresponding to a single piece of operation rule information is given a group number that is in one-to-one correspondence with the number of the operation rule information. The numbering is performed, for example, by the predictive event management section 9.

Specifically, the predictive event correspondence table associates the foregoing number that identifies the group, the number of the operation rule information that corresponds to the number of the group, a combination of pieces of individual filter information (which will be referred to as a filter series), and a monitoring status that indicates the status of generation of predictive event data.

The predictive event correspondence tables 401, 402, and 403 shown in FIG. 8 show the predictive event correspondence tables at the points in time when event data E9001, E9002, and E9003 shown in FIG. 7 is detected, respectively. With the detection of the event data E9001 to E9003, the contents of the predictive event correspondence table change as shown in FIG. 8.

The correspondence between the number of the group, the number of the operation rule information, and the filter series remains unchanged unless the operation rule information is modified. The part that shows the correspondence between the number of the group, the number of the operation rule information, and the filter series in the predictive event correspondence table may be created by the predictive event management section 9 newly assigning the number of the group, and stored into the storage unit (predictive event correspondence table storing section) of the operation management apparatus after the creation of the individual filter information corresponding to the operation rule information at step S713. The part may be created at other timing, however. The part of the monitoring status will be overwritten according to the input of event data.

Figure 9:
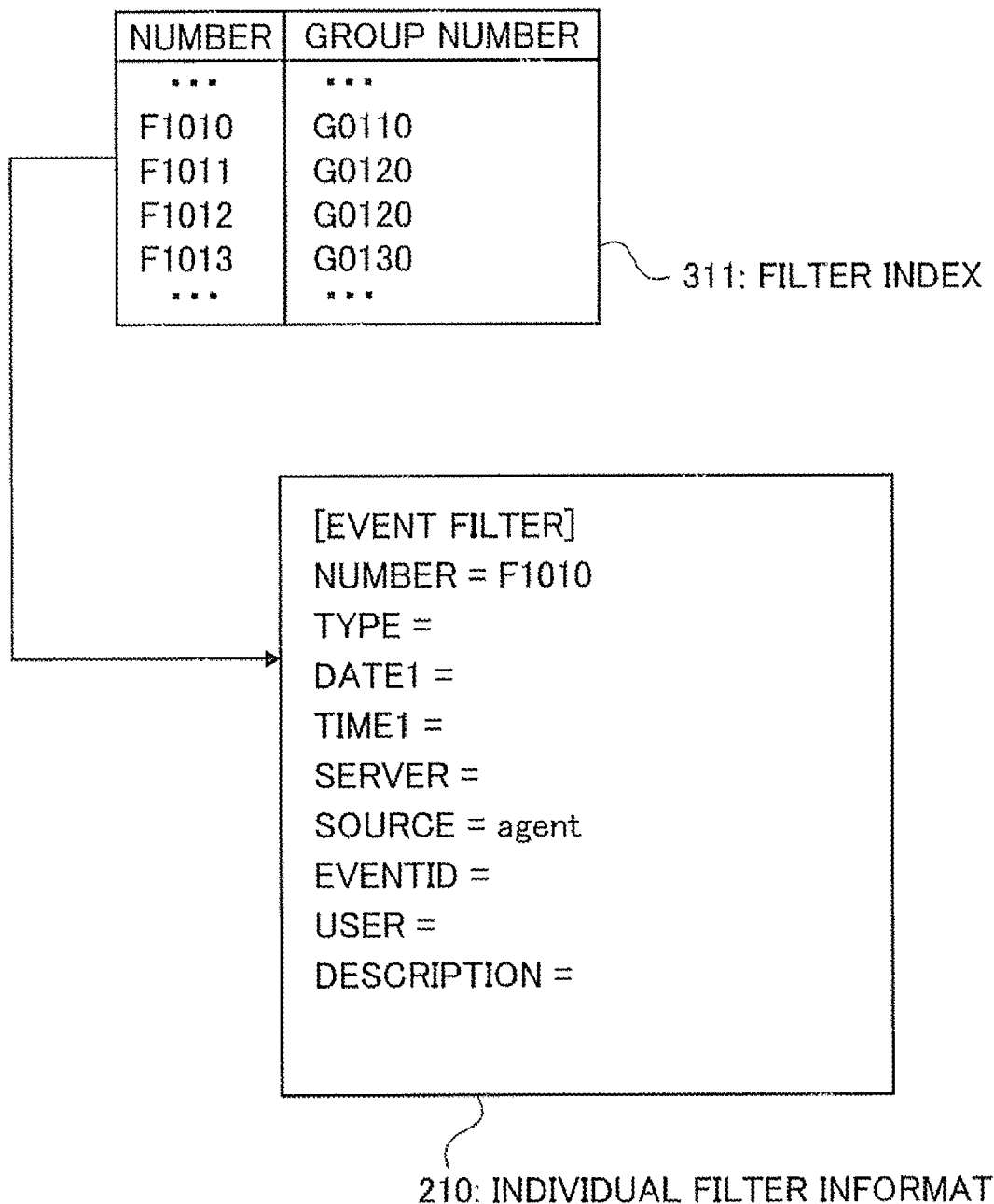
FIG. 9 is an explanatory diagram showing an example of a filter index according to the first exemplary embodiment.

FIG. 9 is an explanatory diagram showing an example of a filter index to be used by the operation management apparatus of the present invention. The filter index is information that associates the number of each piece of individual filter information with the number of the filter series (group) to which the individual filter information belongs. Individual filter information 210 shown in FIG. 9 shows an example of the individual filter information listed in the filter index.

The individual filter information 210 shown in FIG. 9 has no reference value. If there is no reference value to add, the individual filter information and the filter information are identical other than in the number. The filter index lists the pieces of individual filter information with the numbers of the groups corresponding to the respective pieces of individual filter information.

When the predictive event analysis section 10 detects event data that matches individual filter information, the predictive event analysis section 10 can identify the number of the group corresponding to the individual filter information from the filter index, and can refer to the predictive event correspondence table (see FIG. 8) to identify the operation rule information and predictive event data corresponding to that number.

From the number of the operation rule information, the contents of the action included in the operation rule information shown in FIG. 27A can also be identified. The filter index may be created by the predictive event management section 9 and stored into the storage unit of the operation management apparatus, for example, after the creation of the individual filter information corresponding to the operation rule information at step S713. The filter index may be created at other timing.

Figure 10:
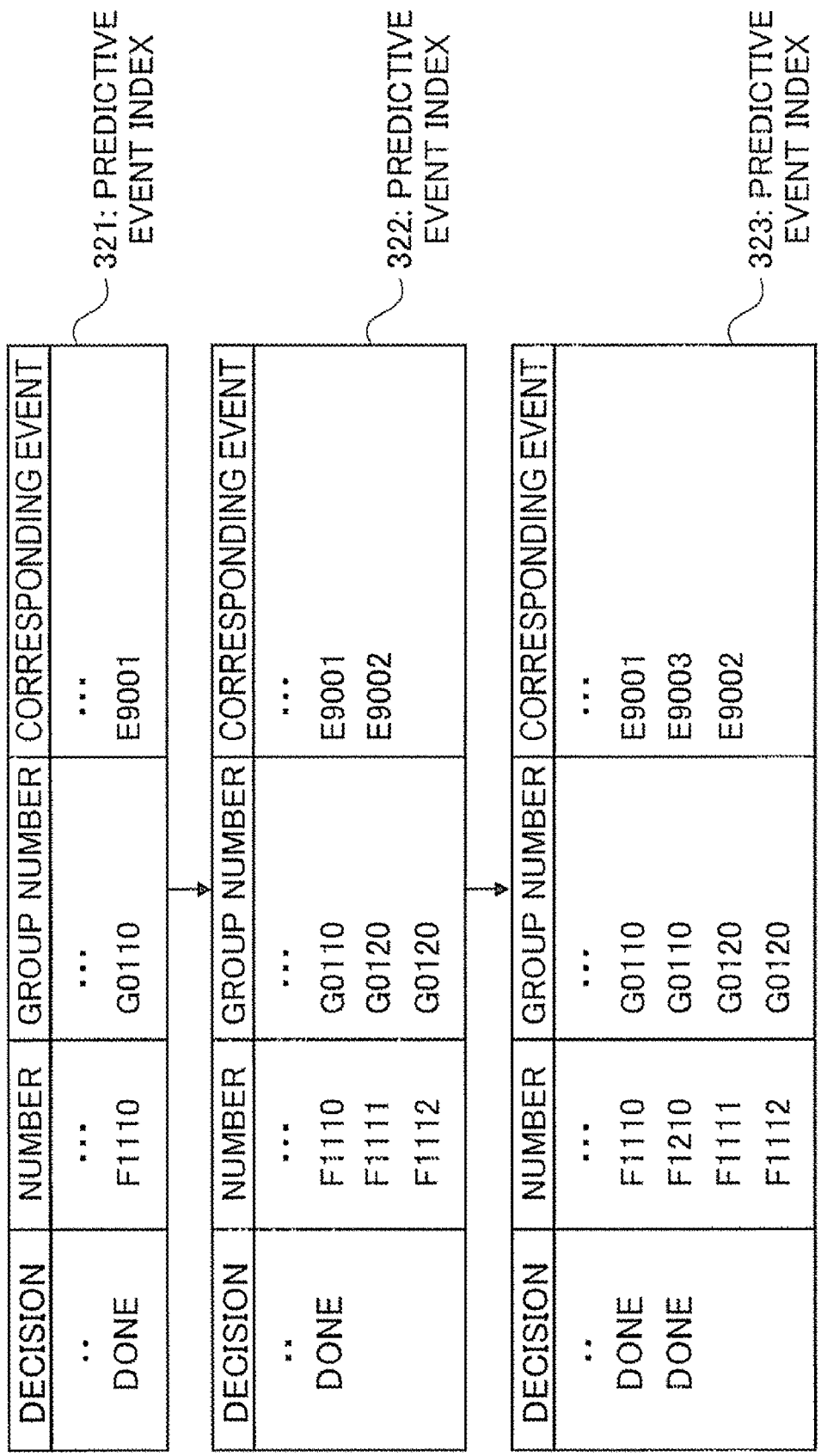
FIG. 10 is an explanatory diagram showing a predictive event index according to the first exemplary embodiment.

FIG. 10 is an explanatory diagram showing examples of a predictive event index to be used by the operation management apparatus of the present invention. The predictive event index includes a number that identifies predictive event data, the number of the group corresponding to the predictive event data, the number of the event data corresponding to the predictive event data, and information that indicates whether or not a decision has been made on the condition of each piece of individual filter information in the corresponding operation rule information.

The predictive event indexes 321, 322, and 323 shown in FIG. 10 show the predictive event indexes when the event data E9001, E9002, and E9003 is detected, respectively, and correspond to the predictive event correspondence tables 401, 402, and 403 shown in FIG. 8, respectively. For example, when the predictive event correspondence table is like the predictive event correspondence table 401 shown in FIG. 8, the predictive event index is like the predictive event index 321 shown in FIG. 10. The predictive event index is stored in the storage unit (predictive event index storing section) of the operation management apparatus.

Figure 11:
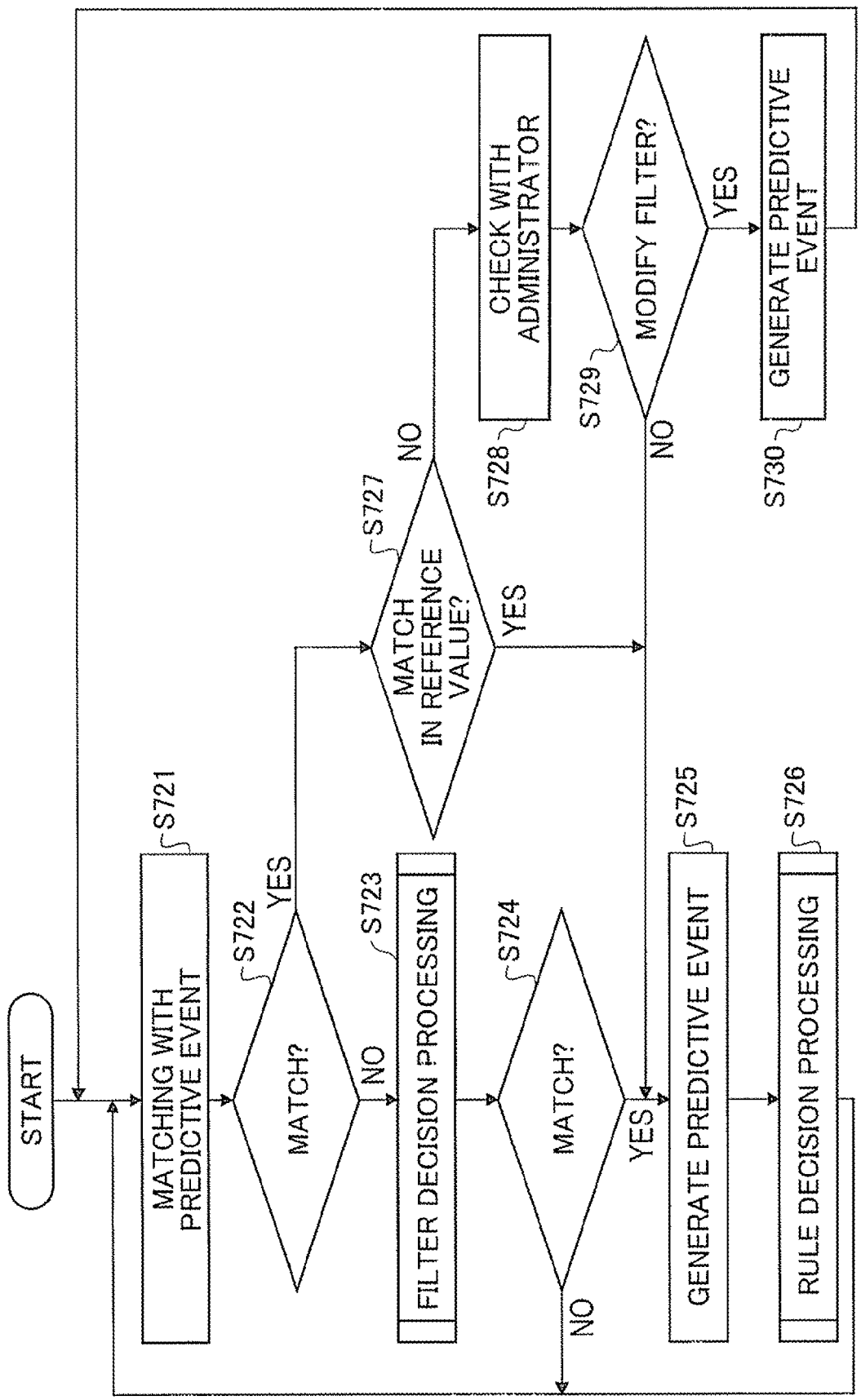
FIG. 11 is a flowchart showing the operation of step S714 shown in FIG. 2.
Figure 12:
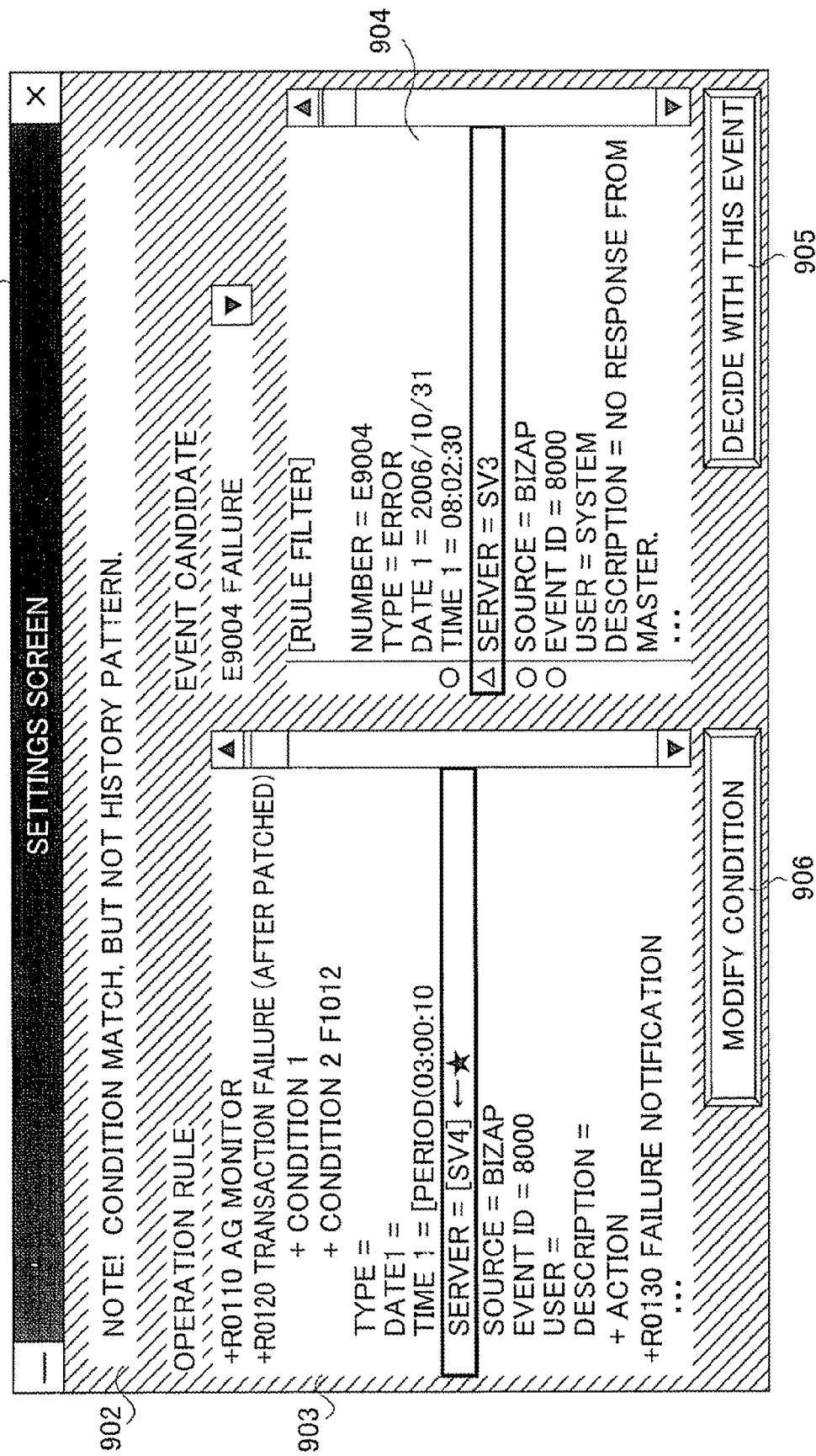
FIG. 12 is an explanatory diagram showing an example of a screen that a user interaction section according to the first exemplary embodiment displays.

FIG. 11 is a flowchart showing the operation of the foregoing step S714. FIG. 12 is an explanatory diagram showing an example of a screen that the user interaction section 5 displays.

As has been described with reference to FIG. 2, when the administrator inputs the operation rule information R0120 (see FIG. 27) to the user interaction section 5, the user interaction section 5 stores the operation rule information R0120 into the decision condition accumulation section 3. The predictive event management section 9 then generates the individual filter information illustrated in FIG. 3 and stores the individual filter information into the predictive event accumulation section 8 (steps S711 to S713). The individual filter information corresponding to the operation rule information R0110 and the operation rule information R0130 is also generated in the same manner.

The predictive event management section 9 assigns a group number to each piece of operation rule information, and generates the filter index 311 (see FIG. 9) in which the numbers of the respective pieces of individual filter information are associated with the group numbers assigned to the pieces of operation rule information corresponding to the individual filter information.

Next, description will be given of an example where the event data shown in FIG. 7 occurs in succession. When the service system 1 generates the event data E9001 according to the operating state and the event data acquisition section 2 receives the event data, the event data acquisition section 2 outputs the event data to the predictive event analysis section 10. When the event data is input from the event data acquisition section 2, the predictive event analysis section 10 performs the processing of step S714. Specifically, the predictive event analysis section 10 performs the operation shown in FIG. 11.

The predictive event analysis section 10 initially performs matching between the event data E9001 input from the event data acquisition section 2 and predictive event data (step S721). At step S721, the predictive event analysis section 10 decides whether or not the attribute values included in the predictive event data, excluding reference values, match the attribute values included in the input event data.

If any variable other than a reference value is included as an attribute value of the predictive event data, matching need not be performed between the variable other than a reference value and the attribute value of the event data. Note that if there is no predictive event data generated, it follows that the event data does not match predictive event data (No at step S722). Here, description will be started from the state where there is no predictive event data. Since the event data does not match any predictive event data, the predictive event analysis section 10 proceeds to step S723.

At step S723, matching (filter decision processing) is performed between the input event data E9001 and individual filter information. Specifically, the predictive event analysis section 10 reads the individual filter information listed in the filter index 311 (see FIG. 9) from the predictive event accumulation section 8 piece by piece, and decides whether or not the event data and the piece of individual filter information match.

The predictive event analysis section 10 decides that the event data and the piece of individual filter information match if all the attribute values included in the piece of individual filter information excluding reference values match the attribute values included in the event data, and decides that they do not match if not. If not match, the next piece of individual filter information is similarly read and decided whether or not it matches the event data.

Figure 29:
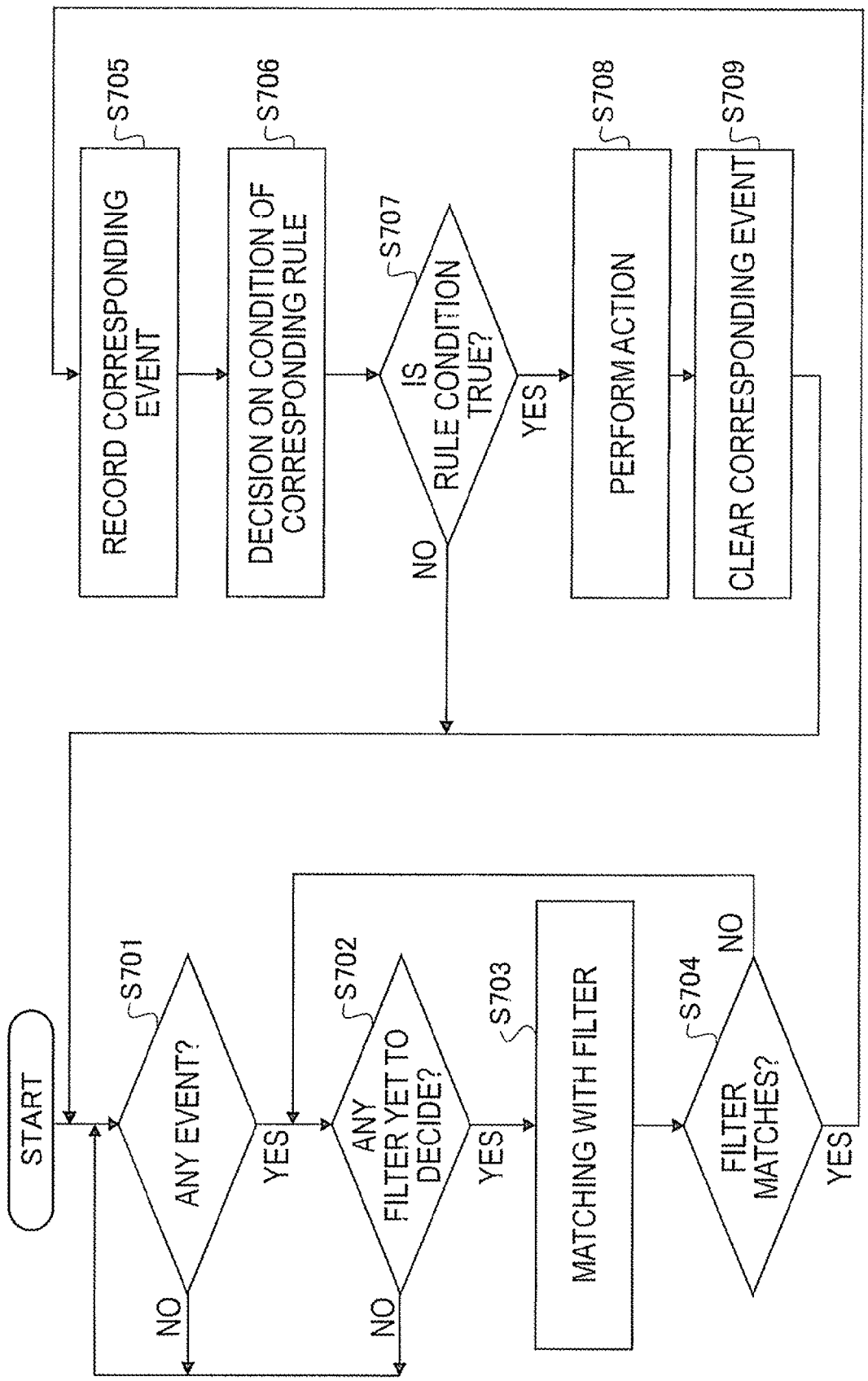
FIG. 29 is a flowchart showing an example of the operation of the operation management apparatus according to the related art.

The predictive event analysis section 10 repeats the foregoing operation until the event data and individual filter information match or until there is no individual filter information that has not been subjected to the decision whether or not to match the event data. Such repetitive processing is the same as the repetitive processing of steps S702 to S704 shown in FIG. 29.

In the present example, the predictive event analysis section 10 decides that the event data E9001 and the individual filter information 210 that is numbered F1010 (see FIG. 9) match (step S723, Yes at step S724), and proceeds to step S725.

At step S725, the predictive event analysis section 10 refers to the filter index 311 to extract the number of the group corresponding to the number of the individual filter information that is decided to match the event data (in the present example, G0110; see FIG. 9). The predictive event analysis section 10 then generates new predictive event data corresponding to the number of the group (step S725).

If it is determined at step S723 that there is individual filter information that matches the event data, the individual filter information is the first piece of individual filter information among the pieces of individual filter information generated from a plurality of pieces of filter information that constitute the combined condition of the operation rule information. That is, proceeding from step S723 to step S725 corresponds to a situation where the first piece of event data that matches any of the pieces of individual filter information corresponding to the operation rule information has been input.

Proceeding thus from step S723 to step S725, the predictive event analysis section 10 substitutes the attribute values of the input event data for the variables of the individual filter information to generate predictive event data to which a number that serves as identification information is assigned.

If there is any other piece of individual filter information that belongs to the same group as that of the individual filter information that is decided to match the event data at step S723 and the piece of individual filter information includes the same variables as the foregoing, the predictive event analysis section 10 also generates predictive event data in which the values of the event data are substituted for the variables.

The predictive event analysis section 10 then writes the number of the predictive event data into the predictive event correspondence table in association with the number of the individual filter information as information that indicates the monitoring status in the predictive event correspondence table (see the predictive event correspondence table 401 shown in FIG. 8).

The predictive event analysis section 10 also creates a predictive event index that associates the number of the predictive event data (here, F1110), the number of the group, and the number of the event data (here, E9001) (See the predictive event index 321 shown in FIG. 10. It should be noted that information "done" is not added at the point in time).

The predictive event analysis section 10 identifies the number R0110 of the operation rule information corresponding to the number of the group from the predictive event correspondence table 401 (see FIG. 8), and outputs the operation rule information of that number, the event data, and the individual filter information corresponding to the operation rule information to the event analysis section 4. Here, the predictive event analysis section 10 identifies the group number corresponding to the operation rule information as event data, and outputs each piece of event data that is associated with that group number in the predictive event index to the event analysis section 4.

The event analysis section 4 decides whether or not the condition of the operation rule information input from the predictive event analysis section 10 and the event data match (step S726). That is, the event analysis section 4 decides whether or not each piece of individual filter information corresponding to the operation rule information input from the predictive event analysis section 10 and the event data match.

In the present example, the number of pieces of individual filter information corresponding to the operation rule information is one, and the individual filter information (F1010) matches the event data E9001. It is therefore decided that the condition of the operation rule information and the event data match. Since the operation rule information R0110 (see FIG. 27) includes no specification of actions, no action will be performed.

In such a case, the event analysis section 4 presents the processing "doing nothing" to the administrator through the user interaction section 5, and notifies the control section 6 of it. In the meantime, the user interaction section 5 notifies the predictive event management section 9 of the result of the action (the completion of display of "do nothing"). Since the action is completed, the predictive event management section 9 writes "done" to the decision field of the predictive event index 321 of FIG. 10, and returns to step S721.

Now, suppose that the service system 1 generates and transmits the event data E9002 shown in FIG. 7 to the operation management apparatus, the event data acquisition section 2 receives the event data, and consequently the event data E9002 is input from the event data acquisition section 2 to the predictive event analysis section 10. As in the foregoing case, the predictive event analysis section 10 then performs matching between the event data E9002 and predictive event data (step S721).

At the point in time, there is the predictive event data numbered F1110 as shown in the predictive event index 321 shown in FIG. 10. The predictive event data numbered F1110 is not subjected to the matching of step S721, however, since the information "done" which indicates that the matching between the corresponding event data and the condition of the operation rule information has been done is added thereto. The predictive event analysis section 10 therefore decides that the event data E9002 and the predictive event data do not match (No at step S722), and proceeds to step S723.

The predictive event analysis section 10 decides that the event data E9002 and the individual filter information 211 (number F1011) shown in FIG. 3 match (step S723, Yes at step S724), and proceeds to step S725. At step S725, the predictive event analysis section 10 refers to the filter index 311 to extract the number of the group corresponding to the number of the individual filter information that is decided to match the event data (in the present example, G0120; see FIG. 9). The predictive event analysis section 10 then generates new predictive event data corresponding to the number of the group (step S725).

Proceeding from step S723 to step S725, the predictive event analysis section 10 substitutes the attribute values of the input event data for the variables of the individual filter information to generate predictive event data to which a number that serves as identification information is assigned. That is, the predictive event analysis section 10 generates predictive event data in which the attribute values of the event data E9002 are substituted for the variables of the individual filter information 211 (number F1011) that matches the event data E9002.

Specifically, the predictive event analysis section 10 generates the predictive event data (the predictive event data numbered F1111 shown in FIG. 4) in which the attribute values of TIME1 and SERVER of the event data E9002 are substituted for the variables of the individual filter information 211 (number F1011) (see FIG. 3). The predictive event analysis section 10 assigns a number (here, F1111) that serves as identification information for distinguishing the predictive event data from other information.

There is another piece of individual filter information (the individual filter information numbered F1012 shown in FIG. 3) that belongs to the same group as that of the individual filter information that is decided to match the event data at step 723. The individual filter information contains the same variables.

Then, the predictive event analysis section 10 also generates predictive event data in which the attribute values of the event data E9002 are substituted for the variables of the individual filter information (number F1012). Specifically, the predictive event analysis section 10 generates the predictive event data (the predictive event data numbered F1112 shown in FIG. 4) in which the attribute values of TIME1 and SERVER of the event data E9002 are substituted for the variables of the individual filter information 212 (number F1012) (see FIG. 3).

The predictive event analysis section 10 adds information that associates the number of the predictive event data (here, F1110), the number of the group, and the number of the event data to the predictive event index.

This results in the predictive event index 322 shown in FIG. 10. There is added information that associates the number F1111, the group number G0120, and the event data E9002. Note that the predictive event data of number F1112 is generated from individual filter information of the same group as that of the individual filter information that matches the event data E9002, and there is no corresponding event data at the point in time (see the predictive event index 322 shown in FIG. 10).

The predictive event analysis section 10 also writes the numbers of the pieces of predictive event data generated (F1111 and F1112) to the "monitoring status" in the predictive event correspondence table in association with the group number G0120 (see the predictive event correspondence table 402 shown in FIG. 8).

The predictive event analysis section 10 identifies the number R0120 of the operation rule information corresponding to the number of the group from the predictive event correspondence table 402 (see FIG. 8), and outputs the operation rule information of that number, the event data, and the individual filter information corresponding to the operation rule information to the event analysis section 4.

The event analysis section 4 decides whether or not each piece of individual filter information corresponding to the operation rule information input from the predictive event analysis section 10 and the event data match (step S726). Here, since there is no event data to match the individual filter information 212 (number F1012) shown in FIG. 3, the event analysis section 4 decides that the condition of the operation rule information numbered R0120 is not satisfied. The predictive event analysis section 10 then waits for the input of new event data.

When the event data E9003 (see FIG. 7) is input to the predictive event analysis section 10, the predictive event analysis section 10 makes the same operation as when the event data E9001 is input. It follows that new predictive event data (which will be numbered F1210) is generated, and the rule decision processing at step S726 is performed. This results in the predictive event correspondence table 403 shown in FIG. 8 and the predictive event index 323 shown in FIG. 10.

Now, the operation by which the administrator modifies filter information will be described for the case where the event data E9004 occurs subsequently. The event data E9004 (see FIG. 7) matches the predictive event data 222 shown in FIG. 4 except in the value of the SERVER attribute. The SERVER attribute of the predictive event data 222 has a reference value, which is assumed to be "SV4," whereas it is "SV3" in the actually-occurring event data E9004.

In the event list 100 of FIG. 26 which has been used to describe the operation management apparatus of the related art, the sources are the same computer "SV3." In the event list 110 shown in FIG. 7, there are two sources "SV3" and "SV4." The situation corresponds, for example, to when "SV4" is added to a system that has been running with "SV3" alone. With the operation management apparatus of the related art, such an increase in device type can preclude administrator-desired operations unless the filter information is modified according to the environmental change.

When the event data E9004 is input to the predictive event analysis section 10 in the state of the predictive event index 323 shown in FIG. 10, the predictive event analysis section 10 performs matching between the event data E9004 and predictive event data (step S721).

Figure 13:
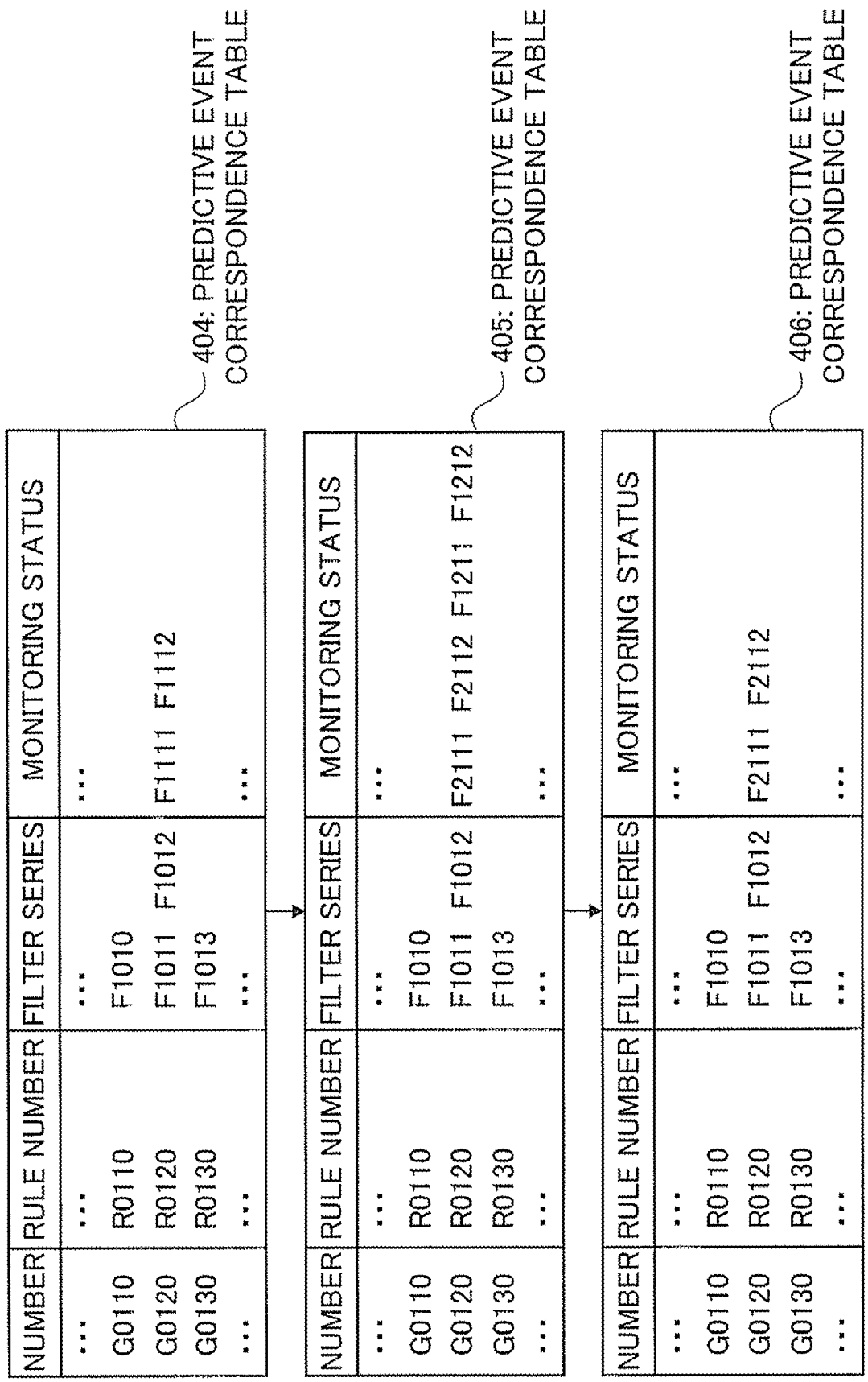
FIG. 13 is an explanatory diagram showing an example of transition of the predictive event correspondence table according to the first exemplary embodiment.
Figure 14:
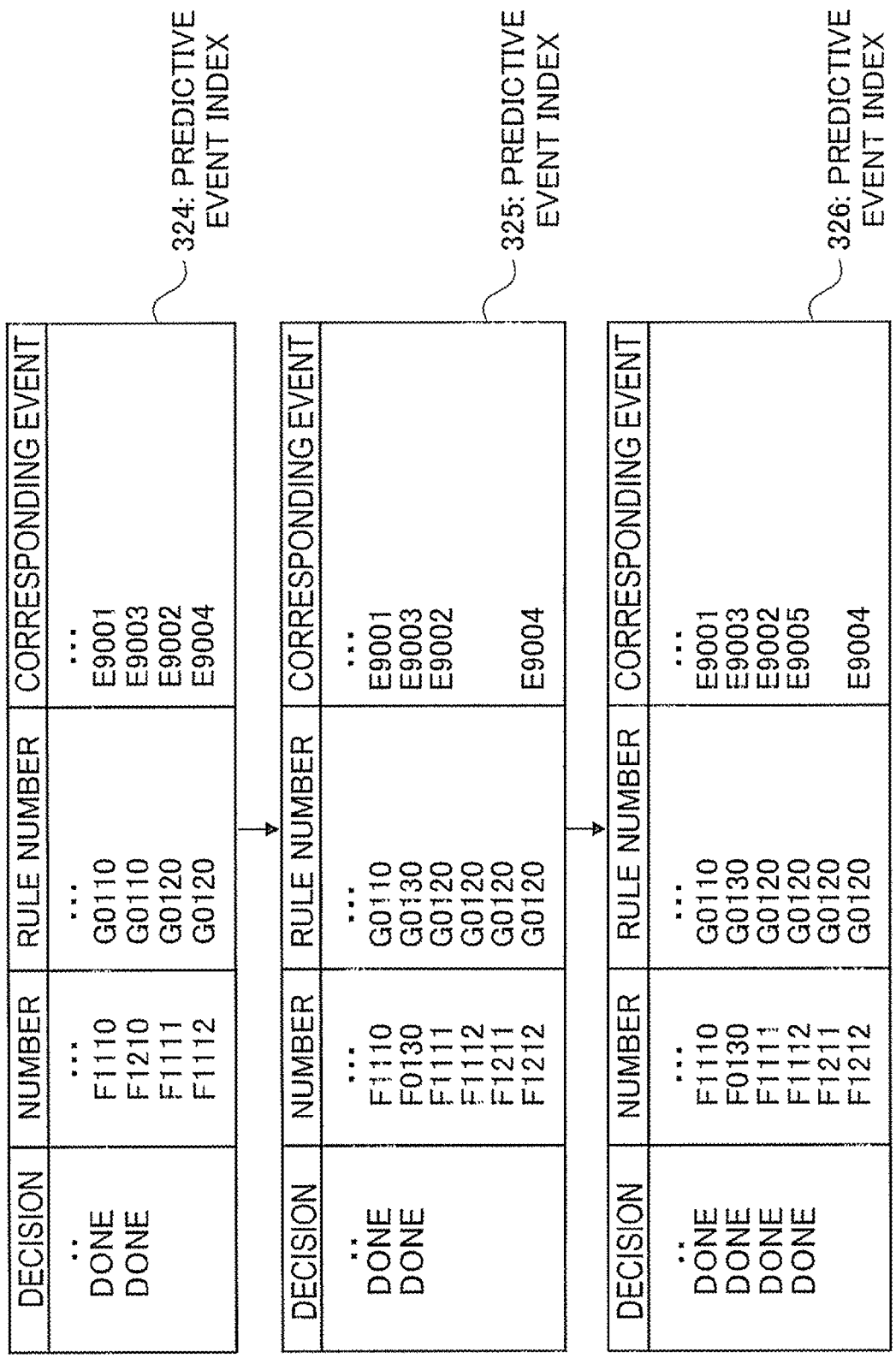
FIG. 14 is an explanatory diagram showing an example of transition of the predictive event index according to the first exemplary embodiment.

FIG. 13 is an explanatory diagram showing an example of transition of the predictive event correspondence table. FIG. 14 is an explanatory diagram showing an example of transition of the predictive event index. The predictive event correspondence tables 404 to 406 shown in FIG. 13 correspond to the predictive event indexes 324 to 326 shown in FIG. 14, respectively. As described above, in the processing of deciding whether or not the event data E9004 and predictive event data match (step S721), the predictive event analysis section 10 decides that the event data E9004 and the predictive event data shown in FIG. 4 (number F1112) match (Yes at step S722).

Deciding that the event data and the predictive event data match, the predictive event analysis section 10 writes the number of the event data that matches the predictive event data (number F1112) to the predictive event index. This transforms the predictive event index 323 shown in FIG. 10 into the predictive event index 324 shown in FIG. 14. The predictive event correspondence table here is the predictive event correspondence table 404 shown in FIG. 13.

If the event data and the predictive event data match, the predictive event analysis section 10 proceeds to step S727 and decides whether or not the attribute values of the event data match the reference values of the predictive event data (step S727). If the attribute values of the event data and the reference values of the predictive event data match (Yes at step S727), the predictive event analysis section 10 proceeds to step S725. If the attribute values of the event data and the reference values of the predictive event data do not match (No at step S727), the predictive event analysis section 10 outputs the event data that is decided to match the predictive event data at step S721 and the comparison information (comparison result) between the reference values and the attribute values of the event data to the event analysis section 4.

The event analysis section 4 presents the event data and the comparison result between the reference values and the attribute values of the event data to the administrator through the user interaction section 5 (step S728). A screen 901 of FIG. 12 is an example of the screen that is thus output. The screen 901 includes: a message display field 902 that indicates the mismatch of the reference values; a tree display field 903 that provides a summary of the operation rule information and the individual filter information along with the reference values; a data display field 904 that shows the contents of the current event data and the results of matching on respective items; and buttons 905 and 906 that accept inputs from the administrator.

In the screen illustrated in FIG. 12, the tree display field 903 presents a "*" mark to indicate that the reference value "SV4" is different from the attribute value of the event data. The data display field 904 shows the results of comparison on the respective items with ○, Δ, and x. ○ indicates a match, and Δ indicates a mismatch with the reference value. The administrator can refer to the screen and select whether to accept the operation rule information with the event data E9004 as a matching rule or to modify the filter information and make a decision again. The button 906 is a button for giving an instruction to modify the filter information. The button 905 is a button for giving an instruction not to modify the filter information.

Event data and predictive event data having different SERVER attribute values may be considered to match, for example, when an identical device has a plurality of aliases, and when a plurality of devices are cooperating so that business software might be affected.

In such cases, the administrator depresses the "Decide with this event" button 905 illustrated in the screen 901. The predictive event management section 9 decides that an instruction is input not to modify the filter information (No at step S729), and proceeds to step S725. At step S725, the predictive event analysis section 10 generates predictive event data (step S725).

That the procedure proceeds from the decision at step S727 to step S725 without the intervention of step S723 means that the second or subsequent piece of event data that matches any of the pieces of individual filter information corresponding to the operation rule information is input. In such cases, there have been created the pieces of predictive event data corresponding to the respective pieces of individual filter information that belong to the same group since the attribute values of the first piece of event data have been input to the pieces of individual filter information when the event data matching any of the pieces of individual filter information corresponding to the operation rule information has been input and the procedure has proceeded to step S725 through the step S723.

When proceeding to step S725 through step S727 without the intervention of step S723, the predictive event analysis section 10 therefore need not perform the operation of substituting the attribute values of the event data for the reference values of the individual filter information to generate the predictive event data.

At step S725, as has been described, the predictive event analysis section 10 also performs the processing of outputting the operation rule information, the event data, and the individual filter information corresponding to the operation rule information to the event analysis section 4.

Subsequently, the event analysis section 4 performs the decision processing at S726. The condition of the operation rule information is decided to be satisfied and the action of the operation rule information is performed when the final piece of event data that matches any of the pieces of individual filter information corresponding to the operation rule information is input (i.e., all the pieces of event data matching the respective individual filter information are input) and the procedure proceeds from the step S727 to steps S725 and S726 (when the procedure proceeds from step S723 to steps S725 and S726 if there is only one individual filter information that corresponds to the operation rule information).

That the button 905 for inputting an instruction not to modify the filter information is depressed means that the event data E9004 is used to make a decision on the operation rule information R0120. This translates into that the condition that the SERVER attribute of the event data should match, which is estimated to be the condition of the operation rule information to be satisfied, need not be satisfied.

The predictive event management section 9 then identifies the individual filter information corresponding to the operation rule information R0120, and deletes from the individual filter information the reference value that shows the condition that the SERVER attribute of the event data should match. Since the operation rule information and the individual filter information are associated in the predictive event correspondence table, the predictive event correspondence table can be consulted to identify the individual filter information corresponding to the operation rule information.

Here, the predictive event management section 9 deletes the reference value [$F02], which shows the condition that the SERVER attribute should match, from each of the pieces of individual filter information (numbers F1011 and F1012; see FIG. 3) corresponding to the operation rule information R0120 to generate the pieces of individual filter information 211 and 212 shown in FIG. 15 (numbers F1011 and F1012) again, and stores them into the predictive event accumulation section 8. This consequently eliminates the mismatch between the attribute values of the event data and the reference values.

If the button 905 for inputting an instruction not to modify the filter information is depressed (No at step S729), the predictive event management section 9 modifies the individual filter information, whereas such processing is omitted in FIG. 11. Note that it is the individual filter information not the filter information that is modified.

After step S725, the event analysis section 4 performs the rule decision processing (step S726). That is, the event analysis section 4 decides whether or not each piece of individual filter information corresponding to the operation rule information input from the predictive event analysis section 10 and the event data match. Here, the event data satisfies the condition of the operation rule information R0120 (the individual filter information of the operation rule information R0120), and the action is performed.

Now, if the event data and the predictive event data need to have the same SERVER attribute value, the administrator depress the "Modify condition" button 906 illustrated in FIG. 12. When the button 906 is depressed, the predictive event management section 9 decides that an instruction to modify the filter information is input (Yes at step S792), and modifies the filter information stored in the decision condition accumulation section 3 (here, the filter information of the operation rule information R0120) so as to reflect that the reference value and the attribute value of the event data need to match.

Specifically, the predictive event management section 9 writes a common variable as the attribute values of the SERVER attributes in the respective pieces of filter information that are specified as the combined condition of the operation rule information R0120. The variable is not written as a reference value. In the present example, the variable is written without the parentheses "[ ]". FIG. 16 shows the filter information that is thus modified.

The predictive event management section 9 writes the additional common variable "$SV" as the attribute values of the SERVER attributes in the respective pieces of filter information 201 and 202 that are specified by the operation rule information R0120 (see FIG. 27B), and stores the filter information 201 and 202 shown in FIG. 16 into the decision condition accumulation section 3.

Consequently, that the pieces of event data matching the respective filter conditions 201 and 202 have the same attribute value for the SERVER attribute is added to the condition of the operation rule information R0120. Along with the modification of the filter information, the predictive event management section 9 also makes the same modification as that to the filter information to the individual filter information that is generated from the filter information and the predictive event data that is generated from the individual filter information (step S730).

In the present example, the predictive event management section 9 modifies the SERVER attributes in the individual filter information 211 and 212 in FIG. 3 from the reference values "$F02" to an identical variable $SV other than a reference value. The individual filter information 213 and 214 shown in FIG. 17 shows the individual filter information that is thus modified.

The predictive event management section 9 also modifies the SERVER attribute in each piece of predictive event data shown in FIG. 4 from the reference value to an attribute value other than a reference value. In the present example, "[ ]" which represent a reference value are deleted to modify the reference value [SV4] into the attribute value SV4 that is not a reference value. The predictive event data 213 and 214 shown in FIG. 18 shows the predictive event data that is thus modified.

After the filter information, the individual filter information, and the predictive event data are modified thus, the procedure returns to step S721 and the predictive event analysis section 10 performs the processing of step S721 and subsequent steps on the input event data E9004 again.

It follows that the predictive event analysis section 10 decides that the event data E9004 with SV3 as the source (i.e., the SERVER attribute) and the predictive event data 224 (see FIG. 18) with SV4 (other than a reference value) as the SERVER attribute do not match (step S721, No at step S722). That is, the event data E9004 is handled as event data irrelevant to the event data E9002 which has already been input.

Subsequently, the predictive event analysis section 10 performs the processing of step S723 and proceeds to step S725. Proceeding from step S723 to step S725, the predictive event analysis section 10 substitutes the attribute values of the input event data for the variables of the individual filter information to generate predictive event data to which a number that serves as identification information is assigned. That is, the predictive event data is generated by the same operation as the predictive event data 211 and 222 (numbers F1111 and F1112) shown in FIG. 4 is generated by.

Since the individual filter information has been modified at step S730, there is generated new predictive event data. Suppose here that predictive event data numbered F1211 and predictive event data numbered F1212 are generated.

The predictive event analysis section 10 adds the information to the predictive event index 324 shown in FIG. 14 to generate the predictive event index 325 shown in FIG. 14 in the same manner as the operation by which the predictive event index 322 (see FIG. 10) is obtained. The predictive event index 325 associates E9004 and F1212, which shows that the predictive event data F1212 is generated from the individual filter information that matches the event data E9004 and the predictive event data F1211 is generated from individual filter information of the same group as that of the individual filter information.

The predictive event analysis section 10 also adds F1211 and F1212 to the monitoring status corresponding to the rule number R0120 of the predictive event correspondence table. This transforms the predictive event correspondence table 404 (see FIG. 13) into the predictive event correspondence table 405 (see FIG. 13). Between F1211 and F1212, F1211 is expected to occur earlier due to the reference value of the TIME1 attribute. If F1212 occurs in advance and event data that matches F1211 occurs later, the same processing as when a mismatch is found in reference value will be performed.

Each time a new event occurs, the generation of predictive event data and the matching are performed as described above. The event list 120 of FIG. 7 shows an example where event data is generated further. When the event data E9005 is input to the predictive event analysis section 10, the predictive event index 325 shown in FIG. 14 changes into the predictive event index 326. Here, the predictive event correspondence table 405 shown in FIG. 13 changes into the predictive event correspondence table 406.

As shown in the predictive event index 326, the event data E9005 matches F1112. The operation rule information R0120 is decided to be true, and the action on "SV4" is performed. The action results in the event data E9006 (see FIG. 7). The event data E9007 corresponds to the predictive event data F1211, and the action on "SV3" is similarly performed, resulting in the event data E9008.

As described above, according to the present exemplary embodiment, when the administrator creates operation rule information in terms of general-purpose logic, conditions dependent on the execution environment based on a past history are automatically added to the conditions of the operation rule information to generate predictive event data. The resulting rule conditions are written with variables so as to adhere to the environment depending on the environment-dependent conditions (for example, a condition that the source servers of event data should be identical), and can thus increase the precision of the rule decisions.

The automatic setting of the environment-dependent conditions and the isolation of the conditions to be specified by the administrator prevent complicated condition description, thereby facilitating the application of the operation rule information to similar environment. This results in a significant reduction of the operation burdens on the administrator when handling the operation rule information, with the effect of increasing the range of application.

Moreover, according to the present exemplary embodiment, the predictive event data is generated according to occurring event data. Since decisions are made not based on logical condition expressions but by matching with the predictive event data which has a similar form to that of the actually-occurring event data, it is easy to describe correlation between a plurality of pieces of event data. Since event data that is expected to occur can be processed by priority, the processing speed can be improved significantly as compared to the operation management apparatus of the related art where all the condition expressions need to be compared. This results in applicability to environment that has a lot of rule conditions such as a large-scale environment.

The predictive event data is generated by developing the environment-dependent conditions such as correlationships into specific values. It is therefore possible to detect differences from predicted values and present the differences to the administrator to prompt actions, for example, when the device configuration or software behavior is changed. This makes it possible to support the activities of following environmental changes and sophisticating the operation rule information for efficient operation.

The present exemplary embodiment has dealt with, but is not limited to, the operations in the case where the pieces of operation rule information have respective different pieces of filter information. A plurality of rules may use common filter information. Even in such a case, individual filter information for each piece of operation rule information can be generated from the common filter information to generate predictive event data.

The present exemplary embodiment has also dealt with, but is not limited to, the case where reference values are generated from past event data. Reference values may be generated from other types of information by using commonly known feature analysis techniques, or may be directly input by the administrator. In any case, the same effect can be obtained as long as it is possible to generate predictive event data having similar series as those of occurring event data and specify correlation between the pieces of event data and reference values.

The timing to modify the predictive event index and the predictive event correspondence table is not limited to that described in the first exemplary embodiment.

Second Exemplary Embodiment

Figure 19:
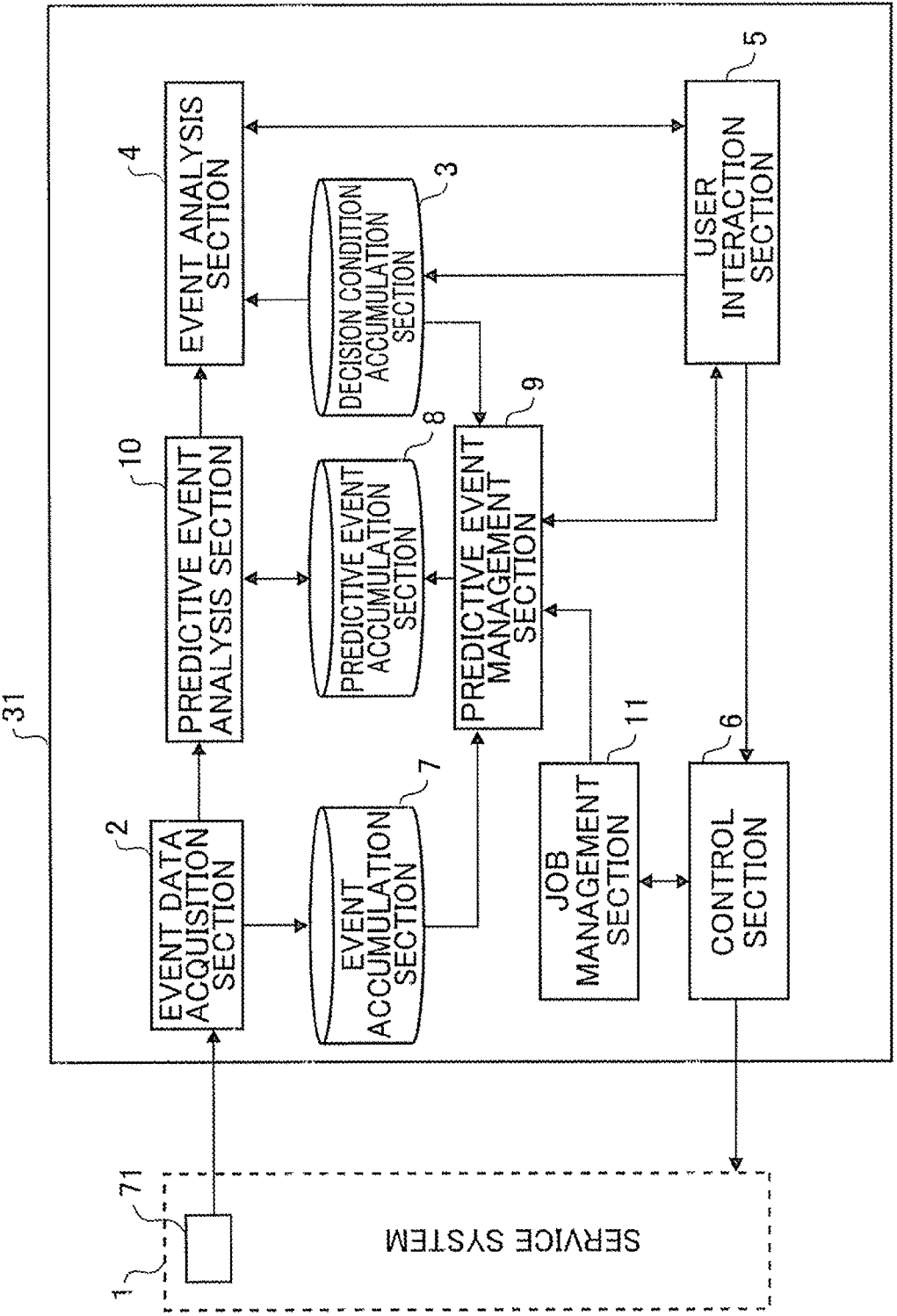
FIG. 19 is a block diagram showing the configuration of an operation management apparatus according to a second exemplary embodiment of the present invention.

FIG. 19 is a block diagram showing a second exemplary embodiment of the present invention. The same components as those of the operation management apparatus 31 according to the first exemplary embodiment shown in FIG. 1 will be designated by the same reference symbols as in FIG. 1, and description thereof will be omitted.

The operation management apparatus 31 according to the second exemplary embodiment includes a job management section 11 in addition to the event data acquisition section 2, the event accumulation section 7, the event analysis section 4, the decision condition accumulation section 3, the user interaction section 5, the control section 6, the predictive event accumulation section 8, the predictive event management section 9, and the predictive event analysis section 10 of the operation management apparatus according to the first exemplary embodiment shown in FIG. 1.

The job management section 11 gives instructions to the control section according to plans of periodic execution of processing and of execution of processing that includes such steps as conditional branching, and notifies the predictive event management section 9 of a schedule of event data to occur along with the execution of processing.

The job management section 11 outputs an instruction for making the service system 1 execute processing to the control section 6 at predetermined timing. When the instruction is input from the job management section 11, the control section 6 makes the service system 1 execute the processing. The event data generating section 71 of the service system 1 successively generates event data along with the execution of the processing, and transmits the event data to the operation management apparatus 31.

The job management section 11 previously contains individual filter information that matches the event data to be successively transmitted from the service system 1 along with the execution of processing of the service system 1. The job management section 11 then outputs the individual filter information to the predictive event management section 9 as information that shows the schedule of event data to occur along with the execution of the processing. Here, the job management section 11 specifies the order of the pieces of individual filter information that match the respective pieces of event data and outputs the individual filter information to the predictive event management section 9 according to the order of occurrence of the event data.

The job management section 11 previously stores the individual filter information to be output to the predictive event management section 9 and the information on the order. Since the processing for the service system 1 to execute based on the output of instructions from the job management section 11 to the control section 6 is determined in advance, it is also known in advance what event data occurs successively.

The administrator can thus create the pieces of individual filter information that match the respective pieces of event data, and input the pieces of individual filter information to the job management section 11 in specified order so that the job management section 11 stores the pieces of individual filter information and the order.

For example, the job management section 11 may previously store the times to make the service system 1 execute processing at, and output the pieces of individual filter information corresponding to the respective pieces of event data to occur along with the execution of the processing and the order of the pieces of individual filter information to the predictive event management section 9 when it comes to the times.

Aside from the processing described in the first exemplary embodiment, the predictive event management section 9 has the new function of generating predictive event data according to the schedule of the event data received from the job management section 11 (i.e., the individual filter information of specified order).

Hereinafter, description will be given of an example where the event data included in the event list 130 shown in FIG. 20 is sent from the service system 1. The event data E9001, E9002, and E9003 shown in FIG. 20 is the same as the event data E9001, E9002, and E9003 shown in FIG. 7. The event data E2001, E2002, and E2003 shown in FIG. 20 is the pieces of event data to be successively generated along with the execution of jobs. Note that E2003 is event data that is generated when an error occurs during the execution of a job.

Figure 21:
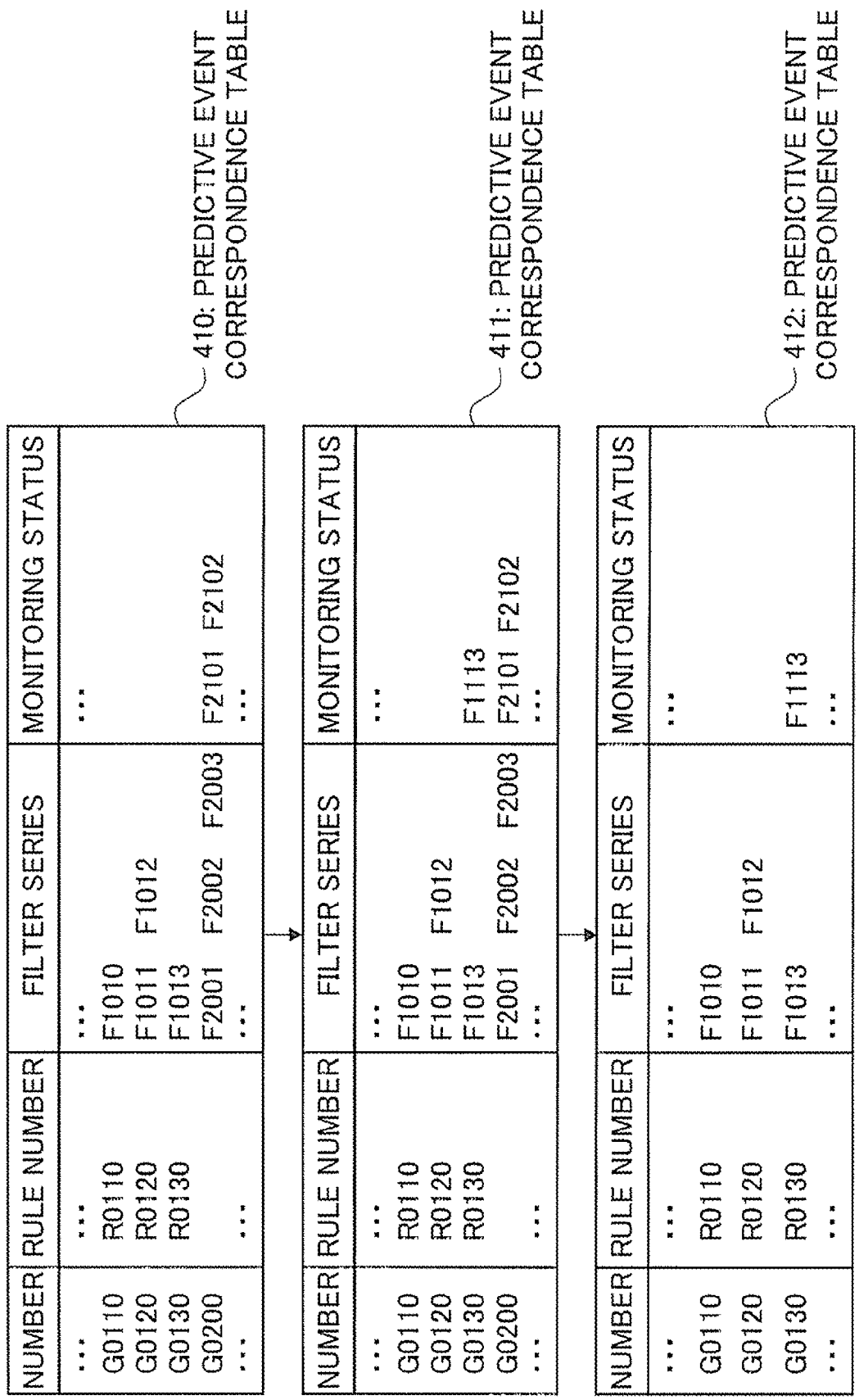
FIG. 21 is an explanatory diagram showing an example of transition of the predictive event correspondence table according to the second exemplary embodiment.
Figure 23:
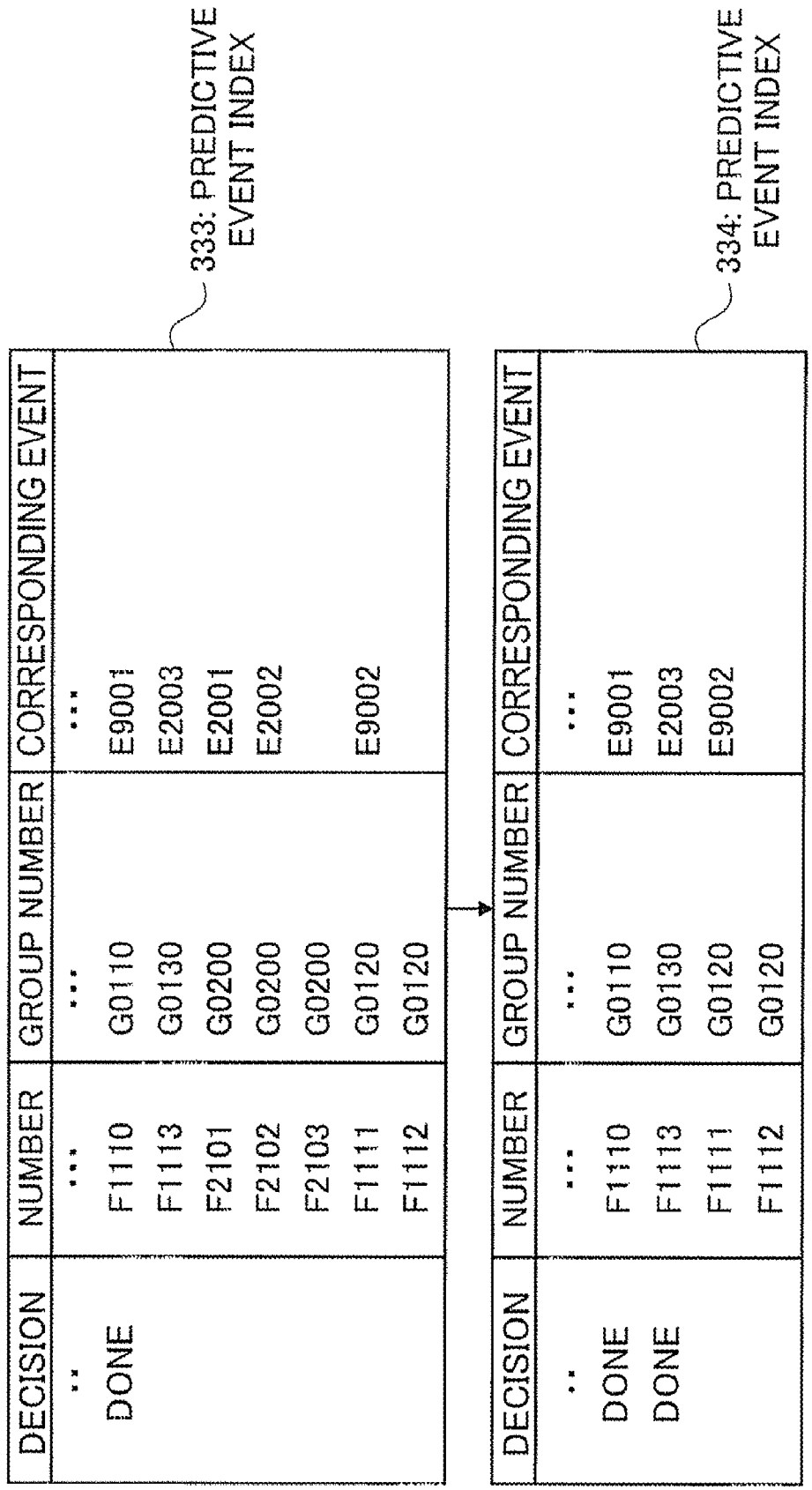
FIG. 23 is an explanatory diagram showing an example of transition of the predictive event index according to the second exemplary embodiment.

FIG. 21 is an explanatory diagram showing an example of transition of a predictive event correspondence table according to the present exemplary embodiment. FIGS. 22 and 23 are explanatory diagrams showing an example of transition of a predictive event index according to the present exemplary embodiment.

Hereinafter, the operation of the operation management apparatus according to the present exemplary embodiment will be described.

When it comes to predetermined timing (for example, predetermined date and time), the job management section 11 outputs an instruction for making the service system 1 execute processing to the control section 6. Here, the job management section 11 outputs the pieces of individual filter information matching the pieces of event data that the service system 1 generates along with the execution of the processing to the predictive event management section 9 in specified order.

The control section 6 makes the service system 1 execute the processing according to the instruction from the job management section 11. It follows that the service system 1 successively generates event data along with the execution of the processing, and transmits the event data to the operation management apparatus 31. For example, the service system 1 successively generates event data that indicates the success or failure of each processing step included in the processing, and transmits the event data to the operation management apparatus 31.

Consequently, as shown in FIG. 20, the pieces of event data on the processing (jobs) executed under the instructions from the job management section 11 (E2001, E2002, and E2003 shown in FIG. 20) are transmitted to the operation management apparatus 31 together with pieces of event data on business services the service system 1 provides (for example, E9001, E9002, and E9003). For example, the event data E2001 shown in FIG. 20 indicates that a software function named job on a computer "SV3" successfully executed processing "JOB1."

The predictive event management section 9 receives such a schedule of occurrence of event data from the job management section 11 as individual filter information, and stores the individual filter information into the predictive event accumulation section 8. The predictive event management section 9 then assigns a group number to the set of individual filter information as a single group.

The predictive event management section 9 then adds the numbers of the respective pieces of information (in the present example, F2001, F2002, and F2003) input from the job management section 11 and the assigned group number (which will be G0200) to the predictive event correspondence table, with the pieces of individual filter information as a filter series.

Here, the number of operation rule information will not be associated. The order of the pieces of the individual filter information shall be F2001, F2002, and F2003. In the predictive event correspondence table 410 shown in FIG. 21, G0200 is the number of the group mentioned above. There is no corresponding rule number, and the individual filter information F2001, F2002, and F2003 for indicating the schedule of occurrence of the event data is set as the filter series.

In such an example, the filter series of F2001, F2002, and F2003 indicates the individual filter information to match the pieces of event data that successively occur when the jobs are performed successfully. The event data E2003 is event data that is generated when a job results in an error, in which case the operation rule information R0130 that defines the action of sending a mail notification to the administrator applies and the action of sending a mail notification to the administrator is performed as shown in FIG. 27. Consequently, the individual filter information F2003 corresponding to the event data for a successful job does not match the event data E2003.

When the event data E9001 shown in FIG. 23 is generated and input to the predictive event analysis section 10, the predictive event analysis section 10 performs the processing of step S721 and subsequent steps. When the event data E9001 is input, there is no predictive event data that matches the event data E9001. The individual filter F2001 that matches the event data E9001 has been transmitted from the job management section 11 to the predictive event management section 9 and stored in the predictive event accumulation section 8.

The procedure thus proceeds from step S721 through step S723 to perform the processing of step S725. The predictive event analysis section 10 generates predictive event data F2101 and F2102. The event data input here is E2001, and the predictive event analysis section 10 also generates predictive event data corresponding to the next piece of event data subsequent to the event data. That predictive event data is F2102.

The predictive event data corresponding to the next piece of event data can be created as in the first exemplary embodiment by using the next piece of individual filter information in the same group. Since the individual filter information is one of the pieces of individual filter information that are output by the job management section 11 in specified order, the next piece of individual filter information corresponding to the next piece of event data can be identified to generate predictive event data.

The predictive event analysis section 10 adds information that associates the event data E2001, the group number G0200, and the predictive event data F2101 generated from E2001 to the predictive event index. The predictive event analysis section 10 also adds information that associates the group number G0200 and F2102 to the predictive event index. Since event data subsequent to E2001 is not input yet, there is no event data corresponding to F2102 at the point in time. The predictive event index 331 shown in FIG. 22 shows the predictive event index in this state.

The predictive event analysis section 10 writes the predictive event data F2101 and F2102 generated into the monitoring status of the predictive event correspondence table in association with the group number G0200 and the filter series F2001, F2002, and F2003.

The predictive event correspondence table 410 shown in FIG. 21 shows the predictive event correspondence table in this state. When a piece of job-related event data is input, the predictive event analysis section 10 generates predictive event data corresponding to the next event and writes the predictive event data into the predictive event correspondence table 410 (see the predictive event correspondence table 410 shown in FIG. 21) since the pieces of event data pertaining to the execution of the jobs occur in succession.

Similarly, when the event data E9002 and the event data E2002 are generated and input to the predictive event analysis section 10, the predictive event analysis section 10 performs the processing of step S721 and subsequent steps to derive the predictive event index 332 shown in FIG. 22. More specifically, information that associates E9002, the group number G0120, and the newly-generated predictive event data F1111, and information that associates the new predictive event data F1112 and the group number G0120 are added to the predictive event index. Such an operation is the same as in the first exemplary embodiment.

The predictive event analysis section 10 adds information that associates the event data E2002, the group number G0200, and the newly-generated predictive event data F2102 to the predictive event index. The predictive event analysis section 10 further creates predictive event data (which will be F2103) corresponding to the next piece of event data, and adds information that associates F2103 and the group number G0200 to the predictive event index (the predictive event index 332 shown in FIG. 22).

If the event data E2003 does not occur (i.e., no error occurs) and event data resulting from normal termination is input to the predictive event analysis section 10, the predictive event analysis section 10 also performs the processing of step S721 and subsequent steps. The predictive event analysis section 10 writes the event data to the predictive event index 332 in association with F2103 and G0200, and writes information that indicates the termination of the processing pertaining to each piece of predictive event data corresponding to G0200 (in the present example, "done").

Suppose now that a job does not end normally, and the event data E2003 indicating the abnormal termination of the job is generated and input to the predictive event analysis section 10. The predictive event analysis section 10 performs the processing of step S721 and subsequent steps. Here, the procedure proceeds to step S721 to step S723, where the event data E2003 does not match the group of individual filter information F2001, F2002, and F2003 for normal termination, but matches other individual filter information (which will be F1013), and the procedure proceeds to step S725.

The predictive event analysis section 10 generates predictive event data (which will be F1113), and adds information that associates F1113, G0130, and E2003 to the predictive event index (the predictive event index 333 shown in FIG. 23). When E2003 occurs, as has been described, the rule R0130 applies and the individual filter information F1013 is associated with R0130.

The predictive event analysis section 10 adds the number F1113 of the generated predictive event data to the predictive event correspondence table (see the predictive event correspondence table 411 shown in FIG. 21) as information corresponding to G0130, R0130, and F1013.

The procedure then proceeds to step S726 and the action of the operation rule information R0130 is performed further. That is, a mail notification is made to the administrator. Receiving the notification, the administrator may abort the job as an abnormal termination. Otherwise, the service system 1 may be recovered.

If information to terminate the job is input through the user interaction section 5, the predictive event management section 9 deletes information that includes the individual filter information input by the job management section 11 as a filter series from the predictive event correspondence table.

In the present example, the information that associates G0200, F2001, F2002, F2003, F2101 and F2102 is deleted from the predictive event correspondence table 411 (see FIG. 21). The predictive event correspondence table 412 shown in FIG. 21 shows the resulting predictive event correspondence table. The predictive event management section 9 also deletes the information that is associated with the group number G0200 from the predictive event index. The resulting predictive event index is the predictive event index 334 shown in FIG. 23.

The administrator recovers the service system 1 and transmits the event data at the time of normal termination to the operation management apparatus. When the event data is input to the predictive event analysis section 10, the predictive event analysis section 10 performs the processing of step S721 and subsequent steps. Consequently, the predictive event analysis section 10 writes the event data to the predictive event index 333 in association with F2103 and G0200, and writes information that indicates the termination of the processing pertaining to each piece of predictive event data corresponding to G0200 (in the present example, "done").

The present example has dealt with the case where the operation rule information R0130 corresponding to the event data E2003 that indicates the abnormal termination of the job defines the mail notification to the administrator. Nevertheless, the operation rule information R0130 corresponding to the event data E2003 that indicates the abnormal termination may define a command to delete the information that is generated based on the individual filter information input by the job management section 11 (in the present example, the information corresponding to the group number G0200) from the predictive event correspondence table and the predictive event index.

The service system 1 may transmit the notification of job termination to the predictive event management section 9 so that the predictive event management section 9 deletes the job-related information (in the present example, the information corresponding to the group number G0200) from the predictive event correspondence table and the predictive event index upon receiving the notification.

As has been described, according to the present exemplary embodiment, event data that is expected to occur systematically along with the execution of jobs can be performed matching with predictive event data for quick processing. This prevents the conditional decisions on the other operation rule information from being affected even if a large number of pieces of event data occur along with the execution of jobs.

The jobs are systematically executed according to date and time specifications or the like, and the dates and times of occurrence and the series of event data corresponding to the jobs are also determined in advance. Since various procedures are defined including for such processing as shifting the execution time depending on the day of the week and for error processing, however, it is not possible to predict series of event data to occur unless all such job procedures can be understood. It is also difficult to describe rule conditions corresponding to the complicated procedures precisely.

With the operation management apparatus of the related art, such rule conditions have been described and processed in the same manner as with other rule conditions. There have thus been the problems that a large number of normal events may increase the processing load, and that the rule conditions accidentally match other conditions to result in a decision error. In contrast, the operation management apparatus of the present exemplary embodiment employs the method of generating predictive event data from the conditions of the operation rule information and performing matching with the same. The event data pertaining to the execution of the jobs can thus be processed efficiently as a series of pieces of event data that occur in succession, not by making decisions on logical condition expressions.

Third Exemplary Embodiment

Figure 24:
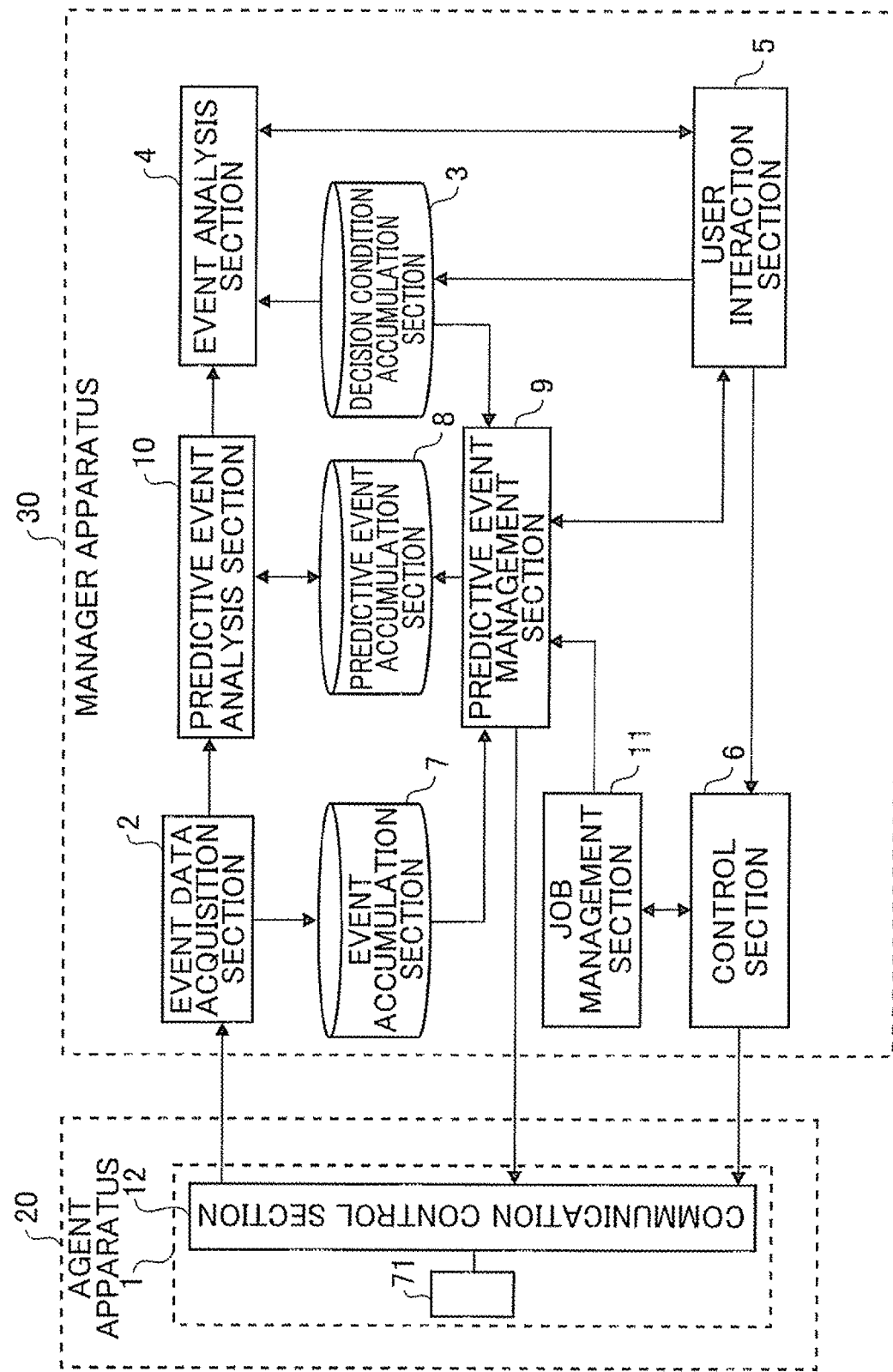
FIG. 24 is a block diagram showing the configuration of an operation management apparatus according to a third exemplary embodiment of the present invention.
Figure 28:
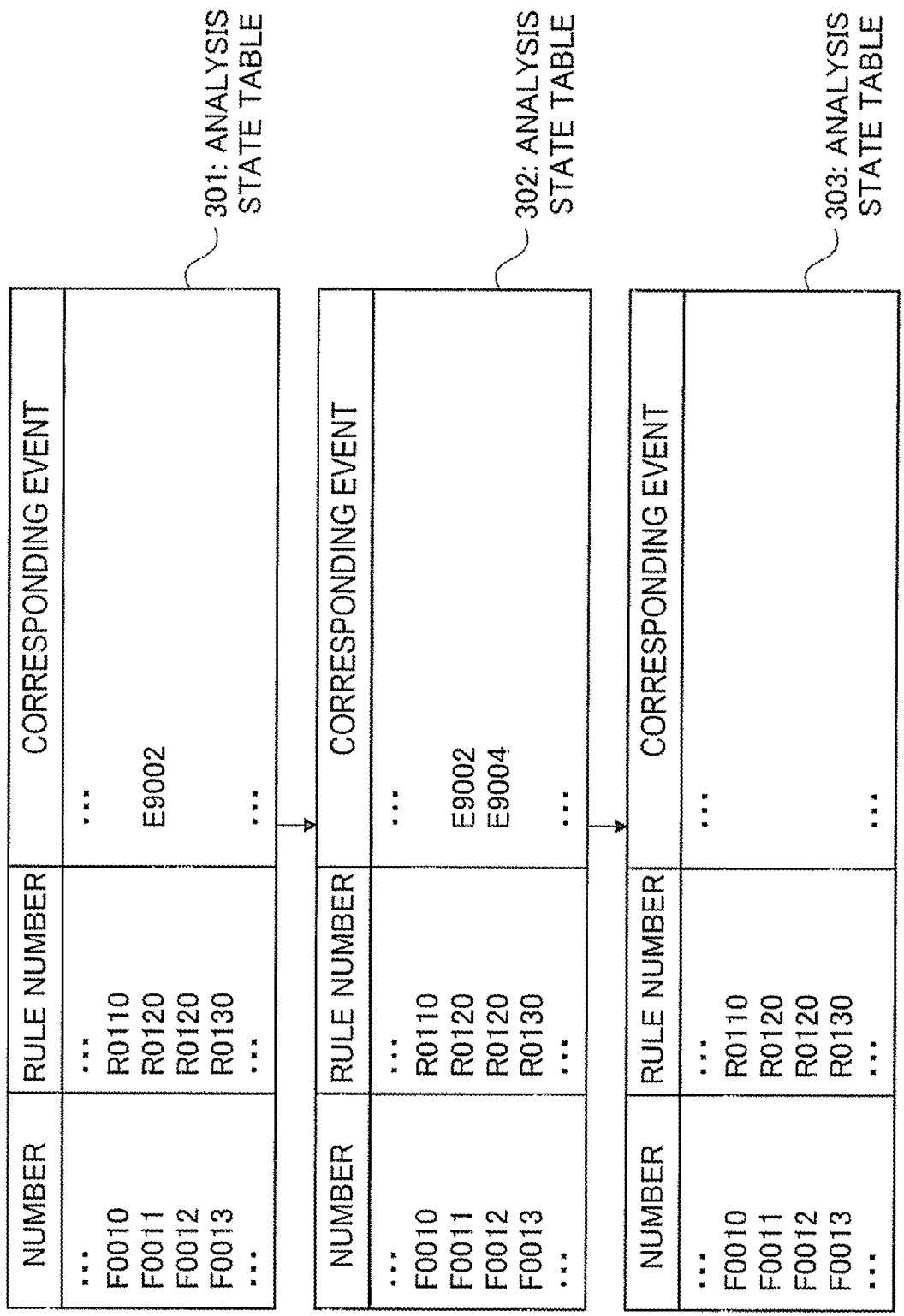
FIG. 28 is an explanatory diagram showing an example of an analysis state table according to related art.

FIG. 24 is a block diagram showing a third exemplary embodiment of the present invention. The same components as those of the operation management apparatuses 31 according to the first exemplary embodiment and the second exemplary embodiment will be designated by the same reference symbols as in FIGS. 1 and 19, and description thereof will be omitted. Hereinafter, the third exemplary embodiment of the present invention will be described with reference to FIGS. 24 and 21.

The operation management apparatus according to the present exemplary embodiment instructs the service system what event data to transmit by priority. The operation management apparatus that gives such instructions will be referred to as a manager apparatus 30. The apparatus that receives such instructions will be referred to as an agent apparatus 20. The agent apparatus 20 includes the service system 1.

Aside from the event data generating section 71, the service system 1 also includes a communication control section 12 that transmits by priority event data to be transmitted by priority according to instructions from the manager apparatus (operation management apparatus) 30. The agent apparatus 20 and the manager apparatus 30 are connected through a communication line or a communication network.

The communication control section 12 transmits event data to the event data acquisition section 2, receives control instructions from the control section 6, and changes the speed or order of transmission and reception of the event data under instructions from the predictive event management section 9. Changing the speed or order of transmission and reception of event data refers to, for example, transmitting event data generated by the event data generating section 71 to the operation management apparatus 30 immediately if the event data matches a condition specified by the predictive event management section 9, and transmitting other event data (event data that does not match the specified condition) collectively at regular time intervals.

Aside from the functions of the second exemplary embodiment, the predictive event management section 9 transmits information that specifies the event data to be received by priority to the communication control section 12 of the service system 1 according to the status of generation of predictive event data.

The operations of the respective sections provided in the operation management apparatus of the present exemplary embodiment are the same as in the first exemplary embodiment and the second exemplary embodiment. Note that the predictive event management section 9 exercises control on the communication control section 12 as to the priority of event data to be received. The event data for the operation management apparatus to receive by priority is event data that matches predictive event data generated by the predictive event management section 9 of the operation management apparatus.

It should be noted that event data that matches predictive event data that is generated as normal events pertaining to job execution need not be received particularly hastily. The predictive event data generated is written in the predictive event correspondence table (see "monitoring status" in the predictive event correspondence tables shown in FIG. 21).

Among the predictive event data written in the predictive event correspondence table, the pieces of predictive event data that have no description of corresponding rule numbers are the predictive event data that is generated as normal events pertaining to job execution. The event data that matches such predictive event data need not be received hastily.

The pieces of event data that match the pieces of predictive event data having a description of corresponding rule numbers among the predictive event data written in the predictive event correspondence table, on the other hand, are the event data to be received by priority. If the predictive event correspondence table contains the number of any piece of predictive event data that has an associated rule number, the predictive event management section 9 transmits the predictive event data identified by the number to the service system 1 to request that the event data matching the predictive event data be transmitted by priority.

The communication control section 12 of the service system 1 receives the predictive event data from the predictive event management section 9. When the event data generating section 71 generates event data, the communication control section 12 then decides whether or not the event data and the received predictive event data match. Here, the event data and the predictive event data may be decided to match if the attribute values included in the predictive event data, excluding reference values, and the attribute values of the event data match.

The communication control section 12 immediately transmits the event data to the operation management apparatus if the event data matches the predictive event data. If the event data does not match the predictive event data, on the other hand, the communication control section 12 retains the event data. The communication control section 12 then transmits the retained event data to the operation management apparatus at regular intervals (such as every 10 minutes).

The event data transmitted from the communication control section 12 is received by the event data acquisition section 2. The operation after the reception of the event data by the event data acquisition section 2 is the same as in the first exemplary embodiment or the second exemplary embodiment.

The operation management apparatus of the related art, which acquires information through a communication network, has had a problem such that some event data can be lost due to a tight communication band when it receives a large number of events frequently, and a fault can occur due to a delay of analysis when on the other hand the interval of reception of event data is widened to ease the load.

In the conventional operation management apparatus which controls the timing of transmission of event data according to the result of conditional decisions, the conditional decisions are made by using logical condition expressions. It follows that the agent apparatus that controls the transmission timing also need to made decisions on logical condition expressions, which has had the problem of increased processing load.

In contrast, the operation management apparatus of the present exemplary embodiment employs the method of developing the conditions into predictive event data for matching. Since the filters in units of pieces of event data (predictive event data that constitutes conditions for specifying event data) can be simply notified to the agent apparatus, it is possible to perform transmission control suited to analysis without increasing the processing load.

While the exemplary embodiments of the present invention have so far been described, the present invention is not limited to the foregoing exemplary embodiments alone and various other additions and modification may be made. The functions of the respective sections provided in the operation management apparatus of the present invention may be not only achieved by hardware but also implemented by a computer and a program. The program is recorded and provided on a computer-readable recording medium such as a magnetic disk and a semiconductor memory, is read by a computer on such occasions as the startup of the computer, and controls the operation of the computer so that the computer functions as each of the sections in each of the foregoing exemplary embodiments.

Fourth Exemplary Embodiment

An operation management apparatus according to a fourth exemplary embodiment of the present invention performs processing when event data matches a defined condition, the event data associating a name of an attribute indicating a state of a system to be managed with an attribute value of the same. The operation management apparatus includes the following rule storing section, individual filter information storing section, predictive event data storing section, predictive event index storing section, predictive event correspondence table storing section, predictive event data matching decision section, individual filter information identification section, predictive event data generating section, and rule decision section.

The rule storing section (for example, the decision condition accumulation section 3) stores operation rule information that defines processing to be performed.

The individual filter information storing section (for example, the predictive event accumulation section 8) stores individual filter information which is information that constitutes conditions defined for respective pieces of operation rule information and that associates attributes and attribute values, where some of the attribute values may be written as a reference value estimated from past event data and some of the attribute values may be written as a variable.

The predictive event data storing section (for example, the predictive event accumulation section 8) stores predictive event data which is data in which an attribute value of event data generated by the system to be managed is substituted for an attribute value that is written as a variable in individual filter information.

The predictive event index storing section stores a predictive event index which is information that associates generated event data, predictive event data generated from individual filter information that matches the event data, and a group which is a set of individual filter information corresponding to operation rule information and to which the individual filter information matching the event data belongs.

The predictive event correspondence table storing section stores a predictive event correspondence table which is information that associates operation rule information, each piece of individual filter information that constitutes a condition defined by the operation rule information, a group to which each piece of individual filter information belongs, and predictive event data generated from the individual filter information.

The predictive event data matching decision section (for example, the predictive event analysis section 10 that performs the processing of step S721) decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values.

The individual filter information identification section (for example, the predictive event analysis section 10 that performs the processing of step S723) identifies individual filter information whose attribute values, excluding a reference value or reference values, match the attribute values of the event data if it is decided that the event data and the predictive event data do not match.

The predictive event data generating section (for example, the predictive event analysis section 10 that performs the processing of step S725), if the individual filter information is successfully identified, substitutes the attribute value of the event data for the variable of each piece of individual filter information that belongs to a group to which the individual filter information belongs, thereby generating predictive event data for each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, each piece of individual filter information belonging to the group, and the operation rule information having each piece of individual filter information as a condition into the predictive event correspondence table storing section.

The rule decision section (for example, the event analysis section 4 that performs the processing of step S726) decides, after the predictive event data is generated by the predictive event data generating section, whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

The foregoing configuration of the present exemplary embodiment may include the following reference value matching decision section, user interface section, and modification section.

The reference value matching decision section (for example, the predictive event analysis section 10 that performs the processing of step S725) decides whether or not the reference value included in the predictive event data matches/match the attribute value of the event data if it is decided that the event data and the predictive event data match.

The user interface section (for example, the event analysis section 4 that performs the processing of step S728 and the user interaction section 5), if it is decided that the event data and the predictive event data match and it is decided that the reference value included in the predictive event data does not/do not match the attribute value of the event data, displays the operation rule information and the event data, displays the attribute value that does not/do not match the reference value, and accepts an instruction whether or not to change the condition of the operation rule information.

The modification section (for example, the predictive event management section 9), if an instruction not to change the condition of the operation rule information is input, deletes the reference value of the attribute of which the attribute value of the event data and the reference value of the predictive event data do not match from the individual filter information, and if an instruction to change the condition of the operation rule information is input, overwrites the attribute value of the attribute of which the attribute value of the event data and the reference value of the predictive event data do not match, the attribute value being of the individual filter information of the group to which the individual filter information used for generating the predictive event data belongs, with an attribute value or attribute values written as a variable or variables, and overwrites the reference value of the predictive event data that does not/do not match the attribute value of the event data with the attribute value other than a reference value.

The foregoing configuration of the present exemplary embodiment may include the following job management section.

The job management section (for example, the job management section 11) retains a plurality of pieces of individual filter information that match a plurality of pieces of event data having a predetermined order of occurrence, and notifies the predictive event data generating section of the plurality of pieces of individual filter information in specified order.

Here, the predictive event data generating section stores information that associates a group and the plurality of pieces of individual filter information into the predictive event correspondence table storing section with a set of the plurality of pieces of individual filter information as the group, and when generating predictive filter information from the individual filter information that is notified by the job management section and event data that matches the individual filter information, generates predictive event data in which the attribute value of the event data is/are substituted for the variable of a piece of individual filter information subsequent to the individual filter information, and adds the generated predictive event data to the information that associates the group and the plurality of pieces of individual filter information.

According to the foregoing configuration, event data that is expected to occur systematically can be performed matching with predictive event data for quick processing. This prevents decisions on the conditions of other operation rule information from being affected even if a large number of pieces of event data occur from the operation of the system to be managed.

The foregoing configuration of the present exemplary embodiment may include the following priority event data request section.

The priority event data request section (for example, the predictive event management section 9), if there is predictive event data that is associated with operation rule information by the predictive event correspondence table storing section, notifies the system to be managed of the predictive event data, thereby requesting the system to be managed to notify by priority of event data that matches the predictive event data among the event data generated by the system to be managed.

According to the foregoing configuration, the system to be managed is notified of the predictive event data that constitutes conditions in units of event data, whereby transmission control suited to analysis can be performed on the system to be managed without increasing the processing load.

The foregoing configuration of the present exemplary embodiment may include the following filter information storing section and individual filter information generating section.

The filter information storing section (for example, the decision condition accumulation section 3) stores filter information that associates an attribute and an attribute value other than a reference value.

The individual filter information generating section (for example, the predictive event management section 9 that performs the processing of steps S712 and S713) generates individual filter information by adding an attribute value estimated from event data that is generated in the past and matches filter information specified by operation rule information to the filter information as a reference value.

According to the foregoing configuration, the filter information to be used for generating individual filter information is prevented from complicated description. Moreover, when the operation rule information is applied to similar environment, individual filter information according to the applied environment is similarly generated from the common description of the filter information. This results in a significant reduction of the operation burdens on the administrator when handling the operation rule information, thereby facilitating increasing the range of application.

Fifth Exemplary Embodiment

An operation management method according to a fifth exemplary embodiment of the present invention is applied to an operation management apparatus that performs processing when event data matches a defined condition, the event data associating a name of an attribute indicating a state of a system to be managed with an attribute value of the same.

The operation management apparatus includes the following rule storing section, individual filter information storing section, predictive event data storing section, predictive event index storing section, and predictive event correspondence table storing section.

The rule storing section (for example, the decision condition accumulation section 3) stores operation rule information that defines processing to be performed.

The individual filter information storing section (for example, the predictive event accumulation section 8) stores individual filter information which is information that constitutes conditions defined for respective pieces of operation rule information and that associates attributes and attribute values, where some of the attribute values may be written as a reference value estimated from past event data and some of the attribute values may be written as a variable.

The predictive event data storing section (for example, the predictive event accumulation section 8) stores predictive event data which is data in which an attribute value of event data generated by the system to be managed is substituted for an attribute value that is written as a variable in individual filter information.

The predictive event index storing section stores a predictive event index which is information that associates generated event data, predictive event data generated from individual filter information that matches the event data, and a group which is a set of individual filter information corresponding to operation rule information and to which the individual filter information matching the event data belongs.

The predictive event correspondence table storing section stores a predictive event correspondence table which is information that associates operation rule information, each piece of individual filter information that constitutes a condition defined by the operation rule information, a group to which each piece of individual filter information belongs, and predictive event data generated from the individual filter information.

The operation management method applied to the operation management apparatus of the foregoing configuration makes the following operation.

Initially, a predictive event data matching decision section (for example, the predictive event analysis section 10) decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values.

Next, an individual filter information identification section (for example, the predictive event analysis section 10) identifies individual filter information whose attribute values, excluding a reference value or reference values, match the attribute values of the event data if it is decided that the event data and the predictive event data do not match.

Next, a predictive event data generating section (for example, the predictive event analysis section 10), if the individual filter information is successfully identified, substitutes the attribute value of the event data for the variable of each piece of individual filter information that belongs to a group to which the individual filter information belongs, thereby generating predictive event data for each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, each piece of individual filter information belonging to the group, and the operation rule information having each piece of individual filter information as a condition into the predictive event correspondence table storing section.

Next, after the predictive event data is generated by the predictive event data generating section, a rule decision section (for example, the event analysis section 4) decides whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

The foregoing configuration of the present exemplary embodiment may include the following operation.

Initially, a reference value matching decision section (for example, the predictive event analysis section 10) decides whether or not the reference value included in the predictive event data matches/match the attribute value of the event data if it is decided that the event data and the predictive event data match.

Next, a user interface section (for example, the event analysis section 4 and the user interaction section 5), if it is decided that the event data and the predictive event data match and it is decided that the reference value included in the predictive event data does not/do not match the attribute value of the event data, displays the operation rule information and the event data, displays the attribute value that does not/do not match the reference value, and accepts an instruction whether or not to change the condition of the operation rule information.

Next, a modification section (for example, the predictive event management section 9), if an instruction not to change the condition of the operation rule information is input, deletes the reference value of the attribute of which the attribute value of the event data and the reference value of the predictive event data do not match from the individual filter information, and if an instruction to change the condition of the operation rule information is input, overwrites the attribute value of the attribute of which the attribute value of the event data and the reference value of the predictive event data do not match, the attribute value being of the individual filter information of the group to which the individual filter information used for generating the predictive event data belongs, with an attribute value or attribute values written as a variable or variables, and overwrites the reference value of the predictive event data that does not/do not match the attribute value of the event data with the attribute value other than a reference value.

The foregoing configuration of the present exemplary embodiment may include the following operation.

Initially, a job management section (for example, the job management section 11) retains a plurality of pieces of individual filter information that match a plurality of pieces of event data having a predetermined order of occurrence, and notifies the predictive event data generating section of the plurality of pieces of individual filter information in specified order.

Next, the predictive event data generating section stores information that associates a group and the plurality of pieces of individual filter information into the predictive event correspondence table storing section with a set of the plurality of pieces of individual filter information as the group, and when generating predictive filter information from the individual filter information that is notified by the job management section and event data that matches the individual filter information, generates predictive event data in which the attribute value of the event data is/are substituted for the variable of a piece of individual filter information subsequent to the individual filter information, and adds the generated predictive event data to the information that associates the group and the plurality of pieces of individual filter information.

The foregoing configuration of the present exemplary embodiment may include the following operation.

A priority event data request section (for example, the predictive event management section 9), if there is predictive event data that is associated with operation rule information by the predictive event correspondence table storing section, notifies the system to be managed of the predictive event data, thereby requesting the system to be managed to notify by priority of event data that matches the predictive event data among the event data generated by the system to be managed.

Sixth Exemplary Embodiment

An operation management program according to a sixth exemplary embodiment of the present invention is implemented on a computer that performs processing when event data matches a defined condition, the event data associating a name of an attribute indicating a state of a system to be managed with an attribute value of the same.

The computer includes the following rule storing section, individual filter information storing section, predictive event data storing section, predictive event index storing section, and predictive event correspondence table storing section.

The rule storing section (for example, the decision condition accumulation section 3) stores operation rule information that defines processing to be performed.

The individual filter information storing section (for example, the predictive event accumulation section 8) stores individual filter information which is information that constitutes conditions defined for respective pieces of operation rule information and that associates attributes and attribute values, where some of the attribute values may be written as a reference value estimated from past event data and some of the attribute values may be written as a variable.

The predictive event data storing section (for example, the predictive event accumulation section 8) stores predictive event data which is data in which an attribute value of event data generated by the system to be managed is substituted for an attribute value that is written as a variable in individual filter information.

The predictive event index storing section stores a predictive event index which is information that associates generated event data, predictive event data generated from individual filter information that matches the event data, and a group which is a set of individual filter information corresponding to operation rule information and to which the individual filter information matching the event data belongs.

The predictive event correspondence table storing section stores a predictive event correspondence table which is information that associates operation rule information, each piece of individual filter information that constitutes a condition defined by the operation rule information, a group to which each piece of individual filter information belongs, and predictive event data generated from the individual filter information.

The operation management program implemented on the computer of the foregoing configuration makes the computer perform the following predictive event data matching decision processing, individual filter information identification processing, predictive event data generation processing, and rule decision processing.

The predictive event data matching decision processing decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values.

The individual filter information identification processing identifies individual filter information whose attribute values, excluding a reference value or reference values, match the attribute values of the event data if it is decided that the event data and the predictive event data do not match.

The predictive event data generation processing, if the individual filter information is successfully identified, substitutes the attribute value of the event data for the variable of each piece of individual filter information that belongs to a group to which the individual filter information belongs, thereby generating predictive event data for each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, each piece of individual filter information belonging to the group, and the operation rule information having each piece of individual filter information as a condition into the predictive event correspondence table storing section.

The rule decision processing decides, after the predictive event data is generated by the predictive event data generating processing, whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

The foregoing configuration of the present exemplary embodiment may make the computer perform the following reference value matching decision processing, display processing, and modification processing.

The reference value matching decision processing decides whether or not the reference value included in the predictive event data matches/match the attribute value of the event data if it is decided that the event data and the predictive event data match.

The display processing, if it is decided that the event data and the predictive event data match and it is decided that the reference value included in the predictive event data does not/do not match the attribute value of the event data, displays the operation rule information and the event data, and displays the attribute value that does not/do not match the reference value.

The modification processing, if an instruction not to change the condition of the operation rule information is input, deletes the reference value of the attribute of which the attribute value of the event data and the reference value of the predictive event data do not match from the individual filter information, and if an instruction to change the condition of the operation rule information is input, overwrites the attribute value of the attribute of which the attribute value of the event data and the reference value of the predictive event data do not match, the attribute value being of the individual filter information of the group to which the individual filter information used for generating the predictive event data belongs, with an attribute value or attribute values written as a variable or variables, and overwrites the reference value of the predictive event data that does not/do not match the attribute value of the event data with the attribute value other than a reference value.

The foregoing configuration of the present exemplary embodiment may make the computer perform the following processing.

The processing stores information that associates a group and a plurality of pieces of individual filter information that match a plurality of pieces of event data having a predetermined order of occurrence into the predictive event correspondence table storing section with the set of individual filter information of defined order as the group. The predictive event data generating processing, when generating predictive filter information from the individual filter information of defined order and event data that matches the individual filter information, generates predictive event data in which the attribute value of the event data is/are substituted for the variable of a piece of individual filter information subsequent to the individual filter information, and adds the generated predictive event data to the information that associates the group and the plurality of pieces of individual filter information.

The foregoing configuration of the present exemplary embodiment may make the computer perform the following priority event data request processing.

The priority event data request processing, if there is predictive event data that is associated with operation rule information by the predictive event correspondence table storing section, notifies the system to be managed of the predictive event data, thereby requesting the system to be managed to notify by priority of event data that matches the predictive event data among the event data generated by the system to be managed.

This application is the National Phase of PCT/JP2008/053830 filed on Mar. 4, 2008, which is based upon and claims the benefit of priority from prior Japanese Patent Application No. 2007-064678, filed Mar. 14, 2007, the entire contents of which are incorporated herein.

INDUSTRIAL APPLICABILITY

The present invention is suitably applied to an operation management apparatus that performs actions when event data that indicates the state of a system to be managed matches a condition.

The invention claimed is:

1. An operation management apparatus for performing processing when event data matches a defined condition, the event data associating a name of an attribute indicating a state of a system to be managed with an attribute value of the same, the apparatus comprising:
 a rule storing section that stores operation rule information that defines processing to be performed;
 an individual filter information storing section that stores individual filter information which is information that constitutes conditions defined for respective pieces of operation rule information and that associates attributes and attribute values, where some of the attribute values may be written as a reference value estimated from past event data and some of the attribute values may be written as a variable;
 a predictive event data storing section that stores predictive event data which is data in which an attribute value of event data generated by the system to be managed is substituted for an attribute value that is written as a variable in individual filter information;
 a predictive event index storing section that stores a predictive event index which is information that associates generated event data, predictive event data generated from individual filter information that matches the event data, and a group which is a set of individual filter information corresponding to operation rule information and to which the individual filter information matching the event data belongs;
 a predictive event correspondence table storing section that stores a predictive event correspondence table which is information that associates operation rule information, each piece of individual filter information that constitutes a condition defined by the operation rule information, a group to which the each piece of individual filter information belongs, and predictive event data generated from the individual filter information;
 a predictive event data matching decision section that decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values;
 an individual filter information identification section that identifies individual filter information whose attribute values, excluding a reference value or reference values, match the attribute values of the event data if it is decided that the event data and the predictive event data do not match;

a predictive event data generating section that, if the individual filter information is successfully identified, substitutes the attribute value of the event data for the variable of each piece of individual filter information that belongs to a group to which the individual filter information belongs, thereby generating predictive event data for the each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, the each piece of individual filter information belonging to the group, and the operation rule information having the each piece of individual filter information as a condition into the predictive event correspondence table storing section; and a rule decision section that decides, after the predictive event data is generated by the predictive event data generating section, whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

2. The operation management apparatus according to claim 1, comprising:

a reference value matching decision section that decides whether or not the reference value included in the predictive event data matches/match the attribute value of the event data if it is decided that the event data and the predictive event data match;

a user interface section that, if it is decided that the event data and the predictive event data match and it is decided that the reference value included in the predictive event data does not/do not match the attribute value of the event data, displays the operation rule information and the event data, displays the attribute value that does not/do not match the reference value, and accepts an instruction whether or not to change the condition of the operation rule information; and a modification section that, if an instruction not to change the condition of the operation rule information is input, deletes the reference value of the attribute of which the attribute value of the event data and the reference value of the predictive event data do not match from the individual filter information, and if an instruction to change the condition of the operation rule information is input, overwrites the attribute value of the attribute of which the attribute value of the event data and the reference value of the predictive event data do not match, the attribute value being of the individual filter information of the group to which the individual filter information used for generating the predictive event data belongs, with an attribute value or attribute values written as a variable or variables, and overwrites the reference value of the predictive event data that does not/do not match the attribute value of the event data with the attribute value other than a reference value.

3. The operation management apparatus according to claim 1, comprising a job management section that retains a plurality of pieces of individual filter information that match a plurality of pieces of event data having a predetermined order of occurrence, and notifies the predictive event data generating section of the plurality of pieces of individual filter information in specified order, and wherein the predictive event data generating section stores information that associates a group and the plurality of pieces of individual filter information into the predictive event correspondence table storing section with a set of the plurality of pieces of individual filter information as the group, and when generating predictive filter information from the individual filter information that is notified by the job management section and event data that matches the individual filter information, generates predictive event data in which the attribute value of the event data is/are substituted for the variable of a piece of individual filter information subsequent to the individual filter information, and adds the generated predictive event data to the information that associates the group and the plurality of pieces of individual filter information.

4. The operation management apparatus according to claim 1, comprising a priority event data request section that, if there is predictive event data that is associated with operation rule information by the predictive event correspondence table storing section, notifies the system to be managed of the predictive event data, thereby requesting the system to be managed to notify by priority of event data that matches the predictive event data among the event data generated by the system to be managed.

5. The operation management apparatus according to claim 1, comprising:

a filter information storing section that stores filter information that associates an attribute and an attribute value other than a reference value; and an individual filter information generating section that generates individual filter information by adding an attribute value estimated from event data that is generated in the past and matches filter information specified by operation rule information to the filter information as a reference value.

6. An operation management method to be applied to an operation management apparatus that performs processing when event data matches a defined condition, the event data associating a name of an attribute indicating a state of a system to be managed with an attribute value of the same, the apparatus comprising:

a rule storing section that stores operation rule information that defines processing to be performed;

an individual filter information storing section that stores individual filter information which is information that constitutes conditions defined for respective pieces of operation rule information and that associates attributes and attribute values, where some of the attribute values may be written as a reference value estimated from past event data and some of the attribute values may be written as a variable;

a predictive event data storing section that stores predictive event data which is data in which an attribute value of event data generated by the system to be managed is substituted for an attribute value that is written as a variable in individual filter information;

a predictive event index storing section that stores a predictive event index which is information that associates generated event data, predictive event data generated from individual filter information that matches the event data, and a group which is a set of individual filter information corresponding to operation rule information and to which the individual filter information matching the event data belongs; and a predictive event correspondence table storing section that stores a predictive event correspondence table which is information that associates operation rule information, each piece of individual filter information that constitutes a condition defined by the operation rule information, a group to which the each piece of individual filter information belongs, and predictive event data generated from the individual filter information, and wherein a predictive event data matching decision section decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values, an individual filter information identification section identifies individual filter information whose attribute values, excluding a reference value or reference values, match the attribute values of the event data if it is decided that the event data and the predictive event data do not match, a predictive event data generating section, if the individual filter information is successfully identified, substitutes the attribute value of the event data for the variable of each piece of individual filter information that belongs to a group to which the individual filter information belongs, thereby generating predictive event data for the each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, the each piece of individual filter information belonging to the group, and the operation rule information having the each piece of individual filter information as a condition into the predictive event correspondence table storing section, and after the predictive event data is generated by the predictive event data generating section, a rule decision section decides whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

7. The operation management method according to claim 6, wherein a reference value matching decision section decides whether or not the reference value included in the predictive event data matches/match the attribute value of the event data if it is decided that the event data and the predictive event data match;

a user interface section, if it is decided that the event data and the predictive event data match and it is decided that the reference value included in the predictive event data does not/do not match the attribute value of the event data, displays the operation rule information and the event data, displays the attribute value that does not/do not match the reference value, and accepts an instruction whether or not to change the condition of the operation rule information; and a modification section, if an instruction not to change the condition of the operation rule information is input, deletes the reference value of the attribute of which the attribute value of the event data and the reference value of the predictive event data do not match from the individual filter information, and if an instruction to change the condition of the operation rule information is input, overwrites the attribute value of the attribute of which the attribute value of the event data and the reference value of the predictive event data do not match, the attribute value being of the individual filter information of the group to which the individual filter information used for generating the predictive event data belongs, with an attribute value or attribute values written as a variable or variables, and overwrites the reference value of the predictive event data that does not/do not match the attribute value of the event data with the attribute value other than a reference value.

8. The operation management method according to claim 6, wherein a job management section retains a plurality of pieces of individual filter information that match a plurality of pieces of event data having a predetermined order of occurrence, and notifies the predictive event data generating section of the plurality of pieces of individual filter information in specified order; and the predictive event data generating section stores information that associates a group and the plurality of pieces of individual filter information into the predictive event correspondence table storing section with a set of the plurality of pieces of individual filter information as the group, and when generating predictive filter information from the individual filter information that is notified by the job management section and event data that matches the individual filter information, generates predictive event data in which the attribute value of the event data is/are substituted for the variable of a piece of individual filter information subsequent to the individual filter information, and adds the generated predictive event data to the information that associates the group and the plurality of pieces of individual filter information.

9. The operation management method according to claim 6, wherein a priority event data request section, if there is predictive event data that is associated with operation rule information by the predictive event correspondence table storing section, notifies the system to be managed of the predictive event data, thereby requesting the system to be managed to notify by priority of event data that matches the predictive event data among the event data generated by the system to be managed.

10. A non-transitory computer-readable recording medium recording an operation management program to be implemented on a computer that performs processing when event data matches a defined condition, the event data associating a name of an attribute indicating a state of a system to be managed with an attribute value of the same, the computer comprising:

a rule storing section that stores operation rule information that defines processing to be performed;

an individual filter information storing section that stores individual filter information which is information that constitutes conditions defined for respective pieces of operation rule information and that associates attributes and attribute values, where some of the attribute values may be written as a reference value estimated from past event data and some of the attribute values may be written as a variable;

a predictive event data storing section that stores predictive event data which is data in which an attribute value of event data generated by the system to be managed is substituted for an attribute value that is written as a variable in individual filter information;

a predictive event index storing section that stores a predictive event index which is information that associates generated event data, predictive event data generated from individual filter information that matches the event data, and a group which is a set of individual filter information corresponding to operation rule information and to which the individual filter information matching the event data belongs; and a predictive event correspondence table storing section that stores a predictive event correspondence table which is information that associates operation rule information, each piece of individual filter information that constitutes a condition defined by the operation rule information, a group to which the each piece of individual filter information belongs, and predictive event data generated from the individual filter information, the operation management program making the computer perform predictive event data matching decision processing that decides that newly-generated event data and previously-existing predictive event data match if the attribute values of the event data match the attribute values of the predictive event data excluding a reference value or reference values, and decides that the newly-generated event data and the previously-existing predictive event data do not match if the attribute values of the event data do not match the attribute values of the predictive event data excluding a reference value or reference values, individual filter information identification processing that identifies individual filter information whose attribute values, excluding a reference value or reference values, match the attribute values of the event data if it is decided that the event data and the predictive event data do not match, predictive event data generating processing that, if the individual filter information is successfully identified, substitutes the attribute value of the event data for the variable of each piece of individual filter information that belongs to a group to which the individual filter information belongs, thereby generating predictive event data for the each piece of individual filter information, stores the predictive event data into the predictive event data storing section, stores information that shows correspondence between the event data, the predictive event data, and the group to which the individual filter information matching the event data belongs into the predictive event index storing section, and stores information that shows correspondence between the predictive event data generated, the group of the individual filter information used for generating the predictive event data, the each piece of individual filter information belonging to the group, and the operation rule information having the each piece of individual filter information as a condition into the predictive event correspondence table storing section, and rule decision processing that decides, after the predictive event data is generated by the predictive event data generating processing, whether or not each piece of event data that is associated in the predictive event index with the group to which the individual filter information that matches the event data used for generating the predictive event data belongs satisfies the individual filter information of the operation rule information corresponding to the group, and if satisfies, performs the processing defined by the operation rule information.

11. The non-transitory computer-readable recording medium according to claim 10, making the computer perform:

reference value matching decision processing that decides whether or not the reference value included in the predictive event data matches/match the attribute value of the event data if it is decided that the event data and the predictive event data match;

display processing that, if it is decided that the event data and the predictive event data match and it is decided that the reference value included in the predictive event data does not/do not match the attribute value of the event data, displays the operation rule information and the event data, and displays the attribute value that does not/do not match the reference value; and modification processing that, if an instruction not to change the condition of the operation rule information is input, deletes the reference value of the attribute of which the attribute value of the event data and the reference value of the predictive event data do not match from the individual filter information, and if an instruction to change the condition of the operation rule information is input, overwrites the attribute value of the attribute of which the attribute value of the event data and the reference value of the predictive event data do not match, the attribute value being of the individual filter information of the group to which the individual filter information used for generating the predictive event data belongs, with an attribute value or attribute values written as a variable or variables, and overwrites the reference value of the predictive event data that does not/do not match the attribute value of the event data with the attribute value other than a reference value.

12. The non-transitory computer-readable recording medium according to claim 10, making the computer perform processing that stores information that associates a group and a plurality of pieces of individual filter information that match a plurality of pieces of event data having a predetermined order of occurrence into the predictive event correspondence table storing section with the set of individual filter information of defined order as the group, and wherein the predictive event data generating processing, when generating predictive filter information from the individual filter information of defined order and event data that matches the individual filter information, generates predictive event data in which the attribute value of the event data is/are substituted for the variable of a piece of individual filter information subsequent to the individual filter information, and adds the generated predictive event data to the information that associates the group and the plurality of pieces of individual filter information.

13. The non-transitory computer-readable recording medium according to claim 10, making the computer perform priority event data request processing that, if there is predictive event data that is associated with operation rule information by the predictive event correspondence table storing section, notifies the system to be managed of the predictive event data, thereby requesting the system to be managed to notify by priority of event data that matches the predictive event data among the event data generated by the system to be managed.

14. An operation management apparatus for performing processing in accordance with event data that associates an attribute indicating a state of a system to be managed with an attribute value of the same, the apparatus comprising:
- a section that, if the attribute value of the event data generated matches the attribute value of previously-set predictive event data other than a reference value, identifies individual filter information that has the attribute value matching the attribute value of the event data from among a plurality of pieces of individual filter information that are associated with a group of previously-set individual filter information;
- a section that adds the attribute value of the event data to variables of the plurality of pieces of individual filter information associated with the group to which the individual filter information identified belongs, thereby generating predictive event data for each of the plurality of pieces of individual filter information; and
- a section that decides whether or not a plurality of pieces of event data previously associated with the group of the individual filter information that matches the event data used for generating the predictive event data satisfy a condition of operation rule information previously associated with the group of the individual filter information, and if satisfy, performs processing in accordance with the operation rule information.

15. An operation management method that is a method of operation of an operation management apparatus that performs processing in accordance with event data that associates an attribute indicating a state of a system to be managed with an attribute value of the same, the method comprising:
- identifying, if the attribute value of the event data generated matches the attribute value of previously-set predictive event data other than a reference value, individual filter information that has the attribute value matching the attribute value of the event data from among a plurality of pieces of individual filter information that are associated with a group of previously-set individual filter information;
- adding the attribute value of the event data to variables of the plurality of pieces of individual filter information associated with the group to which the individual filter information identified belongs, thereby generating predictive event data for each of the plurality of pieces of individual filter information; and
- deciding whether or not a plurality of pieces of event data previously associated with the group of the individual filter information that matches the event data used for generating the predictive event data satisfy a condition of operation rule information previously associated with the group of the individual filter information, and if satisfy, performing processing in accordance with the operation rule information.

16. A non-transitory computer-readable recording medium recording an operation management program that is an operation program of an operation management apparatus that performs processing in accordance with event data that associates an attribute indicating a state of a system to be managed with an attribute value of the same, the program making a computer perform:
- processing that, if the attribute value of the event data generated matches the attribute value of previously-set predictive event data other than a reference value, identifies individual filter information that has the attribute value matching the attribute value of the event data from among a plurality of pieces of individual filter information that are associated with a group of previously-set individual filter information;
- processing that adds the attribute value of the event data to variables of the plurality of pieces of individual filter information associated with the group to which the individual filter information identified belongs, thereby generating predictive event data for each of the plurality of pieces of individual filter information; and
- processing that decides whether or not a plurality of pieces of event data previously associated with the group of the individual filter information that matches the event data used for generating the predictive event data satisfy a condition of operation rule information previously associated with the group of the individual filter information, and if satisfy, performs processing in accordance with the operation rule information.

\* \* \* \* \*